(12) United States Patent
Ichinose et al.

(10) Patent No.: US 7,553,523 B2
(45) Date of Patent: Jun. 30, 2009

(54) LIQUID CRYSTAL MEDIUM

(75) Inventors: Hideo Ichinose, Kanagawa-Pref. (JP);
Shinji Nakajima, Atsugi (JP);
Masahiko Okamura, Atsugi (JP);
Takanori Takeda, Atsugi (JP); Masako Nakamura, Yamatokoriyama (JP)

(73) Assignees: Merck Patent GmbH, Darmstadt (DE);
Sharp Corporation, Osaka-Shi (JP)

( * ) Notice: Subject to any disclaimer, the term of this patent is extended or adjusted under 35 U.S.C. 154(b) by 0 days.

(21) Appl. No.: 11/651,979

(22) Filed: Jan. 11, 2007

(65) Prior Publication Data

US 2007/0170395 A1    Jul. 26, 2007

(30) Foreign Application Priority Data

Jan. 13, 2006   (EP) .................................. 06000715

(51) Int. Cl.
*C09K 19/34* (2006.01)
*C09K 19/30* (2006.01)
*C09K 19/20* (2006.01)
*C09K 19/12* (2006.01)

(52) U.S. Cl. .............. 428/1.1; 252/299.61; 252/299.63; 252/299.66; 252/299.67

(58) Field of Classification Search ............ 252/299.01, 252/299.61, 299.63, 299.66, 299.67; 428/1.1
See application file for complete search history.

(56) References Cited

U.S. PATENT DOCUMENTS

| | | | | |
|---|---|---|---|---|
| 6,902,777 | B2 * | 6/2005 | Hirschmann et al. | 428/1.1 |
| 7,291,367 | B2 * | 11/2007 | Kirsch et al. | 428/1.1 |
| 2005/0205842 | A1 * | 9/2005 | Heckmeier et al. | 252/299.61 |
| 2006/0061699 | A1 | 3/2006 | Kirsch et al. | |
| 2006/0278850 | A1 * | 12/2006 | Czanta et al. | 252/299.61 |

FOREIGN PATENT DOCUMENTS

| WO | WO 2004/048501 A1 | 6/2004 |
|---|---|---|
| WO | WO-2005081215 | * 9/2005 |

* cited by examiner

*Primary Examiner*—Shean C Wu
(74) *Attorney, Agent, or Firm*—Millen, White, Zelano & Branigan, P.C.

(57) ABSTRACT

Disclosed are a liquid crystal medium having a birefringence at 20° C. that is lower than 0.08 and contains 1-30% by weight of one or more compounds of formula IA,
1-10% by weight of one or more compounds of formula IB,
0-9% by weight of one or more compounds of formula IC,

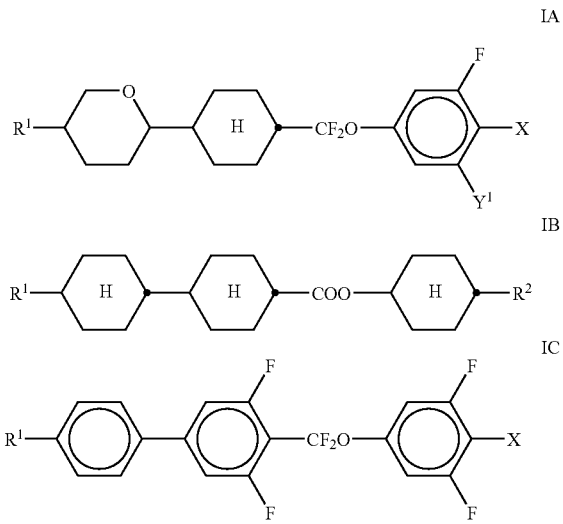

and the use of the medium for electro-optical purposes, and to displays containing the medium.

20 Claims, No Drawings

LIQUID CRYSTAL MEDIUM

The present invention relates to a liquid crystal medium, to its use for electro-optical purposes, and to displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure.

The liquid crystal materials must have good chemical and thermal stability and good stability to electric fields and electromagnetic radiation. Also, the liquid crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid crystal displays of this type are known. Non-linear elements which can be used for individual switching of the individual pixels are, for example, active elements (i.e. transistors). The term "active matrix" is then used, where a distinction can be made between two types:

1. MOS (metal oxide semiconductor) or other diodes on a silicon wafer as substrate.

2. Thin-film transistors (TFTs) on a glass plate as substrate.

The use of single-crystal silicon as substrate material restricts the display size, since even modular assembly of various part-displays results in problems at the joins.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are illuminated from the back.

The term MLC displays here covers any matrix display with integrated non-linear elements, i.e., besides the active matrix, also displays with passive elements, such as varistors or diodes (MIM=metal-insulator-metal). MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties, in particular the so-called "low temperature stability" (LTS) of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not meet today's requirements.

There thus continues to be a great demand for MLC displays having very high specific resistance at the same time as a large working-temperature range, short response times even at low temperatures and low threshold voltage which do not have these disadvantages, or only do so to a reduced extent.

In TN (Schadt-Helfrich) cells, media are desired which facilitate the following advantages in the cells:

extended nematic phase range (in particular down to low temperatures)

the ability to switch at extremely low temperatures (outdoor use, automobile, avionics)

increased resistance to UV radiation (longer service life).

The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

For TV and monitor applications, media are desired which have a fast response time and a low threshold voltage, furthermore a good low temperature stability are required. Also, depending on the thickness of the switchable LC layer, a high birefringence may be required.

The present invention thus has the object of providing media, in particular for MLC, TN or STN displays of this type, which do not have the above-mentioned disadvantages or only do so to a reduced extent, and preferably simultaneously have very high specific resistances, low threshold voltages, an improved LTS and fast switching times.

It has now been found that this object can be achieved if media according to the invention are used in displays.

The present invention thus relates to a liquid crystal medium, in particular a medium based on a mixture of polar compounds, characterised in that it comprises 1-30% by weight of one or more compounds of formula IA,
1-10% by weight of one or more compounds of formula IB,
0-9% by weight of one or more compounds of formula IC, IA
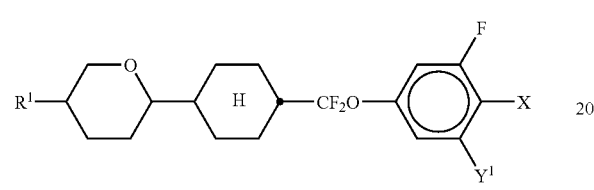

IB
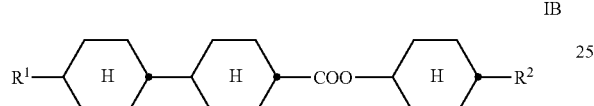

IC
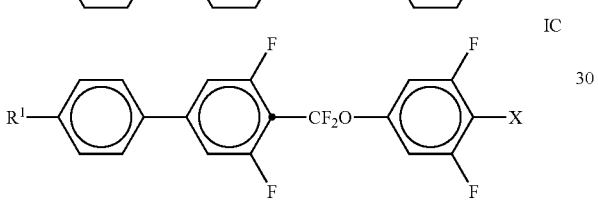

wherein
$R^1$ and $R^2$ are each, independently of one another, an alkyl radical having from 1 to 12 carbon atoms which is unsubstituted, monosubstituted by CN or $CF_3$ or at least monosubstituted by halogen, wherein one or more $CH_2$ groups are optionally, in each case independently of one another, replaced by —O—, —S—,

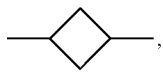

—CH=CH—, —C≡C—, —CO—, —CO—O—, —O—CO— or —O—CO—O— in such a way that O atoms are not linked directly to one another,
$Y^1$ is H or F,
X is F, Cl or a halogenated alkyl, alkenyl, alkoxy or alkenyloxy radical having up to 6 carbon atoms.

In the pure state, the compounds of the formulae IA-IC are colourless and form liquid crystalline mesophases in a temperature range which is favourably located for electro-optical use. They are stable chemically, thermally and to light.

$R^1$ and $R^2$ in formula IA, IB and IC are preferably straight-chain alkyl or alkoxy with 1 to 12, very preferably 2, 3, 4, 5, 6 or 7 C-atoms.

X in formula IA is preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or $CH=CF_2$, most preferably F or $OCF_3$.

Especially preferred compounds of formula IA are those selected of the following formulae

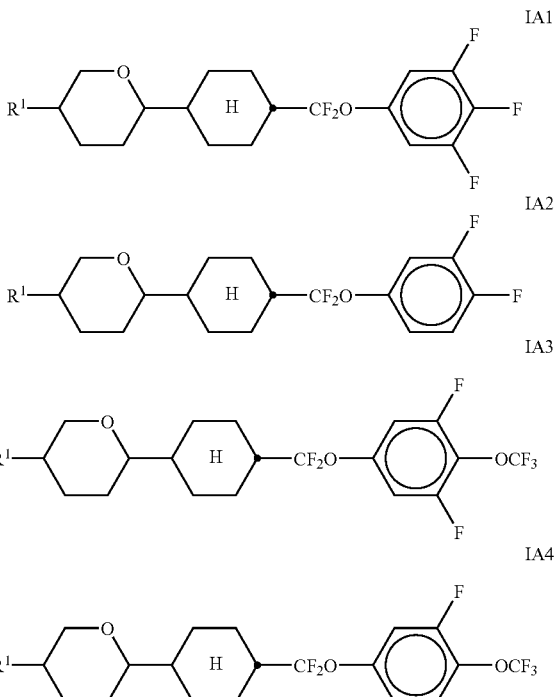

wherein $R^1$ has the meaning given in formula IA. Very preferred are compounds of formula IA1.

Especially preferred compounds of formula IB are those wherein $R^1$ and $R^2$ are selected from straight-chain alkyl with 2, 3, 4, 5 or 6 C-atoms.

Especially preferred compounds of formula IC are those wherein $R^1$ is selected from straight-chain alkyl with 2, 3, 4, 5 or 6 C-atoms.

The compounds of the formulae IA, IB and IC are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

The invention also relates to electro-optical displays (in particular STN or MLC displays having two plane-parallel outer plates, which, together with a frame, form a cell, integrated non-linear elements for switching individual pixels on the outer plates, and a nematic liquid crystal mixture of positive dielectric anisotropy and high specific resistance which is located in the cell) which contain media of this type, and to the use of these media for electro-optical purposes. Besides for reflective displays, the mixtures according to the invention are also suitable for IPS (in plane switching) applications, OCB (optically controlled birefringence) applications and VA (vertical alignment) applications.

The liquid crystal mixtures according to the invention enable a significant widening of the available parameter latitude. Especially, it was found that by using liquid crystal mixtures comprising compounds of formula IA, IB and optionally IC, it is possible to obtain mixtures having a low threshold voltage and an improved LTS, especially at temperatures of −20° C. or lower, in particular −40° C. or lower.

The achievable combinations of clearing point, rotational viscosity $\gamma_1$ low $\Delta n$ and dielectric anisotropy are far superior to previous materials from the prior art.

The requirement for a high clearing point, a nematic phase at low temperature and a high positive $\Delta\epsilon$ has hitherto only been achieved to an inadequate extent. Although there are prior art mixtures, like for example MLC-6424, that have high positive $\Delta\epsilon$, they only have a low value of the clearing point and a high value for the rotational viscosity $\gamma_1$. Other mixture systems have good flow viscosities $v_{20}$ and $\Delta\epsilon$ values, but only have clearing points in the region of 60° C.

The birefringence of the mixtures according to the invention at 20° C. is lower than 0.08, preferably lower than 0.075, very preferably from 0.06 to 0.074, most preferably from 0.07 to 0.073.

The liquid crystal mixtures according to the invention, while retaining the nematic phase down to −20° C., preferably down to −30° C. and particularly preferably down to −40° C., enable clearing points above 80° C., preferably above 85° C., simultaneously dielectric anisotropy values $\Delta\epsilon$ of $\geqq 8$, preferably $\geqq 10$, and a high value for the specific resistance to be achieved, enabling excellent STN and MLC displays to be obtained. In particular, the mixtures are characterised by low operating voltages. The TN thresholds are below 2.0 V, preferably below 1.7 V, particularly preferably below 1.5 V.

It goes without saying that, through a suitable choice of the components of the mixtures according to the invention, it is also possible for higher clearing points (for example above 110°) to be achieved at a higher threshold voltage or lower clearing points to be achieved at lower threshold voltages with retention of the other advantageous properties. At viscosities correspondingly increased only slightly, it is likewise possible to obtain mixtures having greater $\Delta\epsilon$ and thus lower thresholds. The MLC displays according to the invention preferably operate at the first Gooch and Tarry transmission minimum [C. H. Gooch and H. A. Tarry, Electron. Lett. 10, 24, 1974; C. H. Gooch and H. A. Tarry, Appl. Phys., Vol. 8, 1575-1584, 1975] are used, where, besides particularly favourable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. This enables significantly higher specific resistances to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The flow viscosity $v_{20}$ at 20° C. is preferably <60 mm²·s⁻¹, particularly preferably <50 mm²·s⁻¹. The rotational viscosity $\gamma_1$ of the mixtures according to the invention at 20° C. is preferably <250 mPa·s, particularly preferably <210 mPa·s. The nematic phase range is preferably at least 90° C., particularly preferably at least 100° C. This range preferably extends at least from −20° C. to +80° C.

Measurements of the capacity holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR with increasing temperature than, for example, analogous mixtures comprising cyanophenylcyclohexanes of the formula

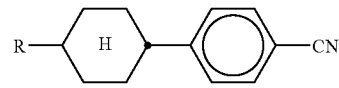

or esters of the formula

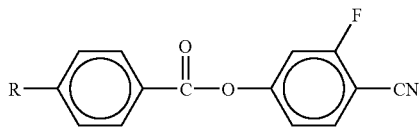

instead of the compounds of the formula I according to the invention.

The UV stability of the mixtures according to the invention is also considerably better, i.e. they exhibit a significantly smaller decrease in the HR on exposure to UV.

The media according to the invention do preferably contain only low amounts ($\leqq 10$ wt. %) of compounds comprising a cyano group, very preferably no such compounds. The values of the Holding Ratio of the media according to the present invention are preferably >98%, very preferably >99% at 20° C.

In liquid crystal display devices short switching times are especially preferred, in particular when used in video and TV applications. For these applications switching times ($t_{on}+t_{off}$) below 25 ms are needed. The upper limit of the switching time is determined by the repeating rate of the picture.

Preferred embodiments the present invention are indicated below:

The medium additionally comprises one or more compounds selected from the group consisting of the general formulae II to VII:

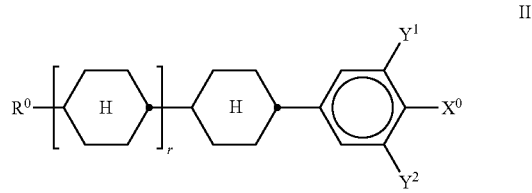

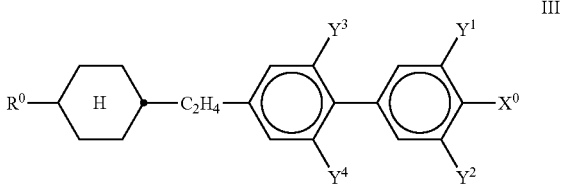

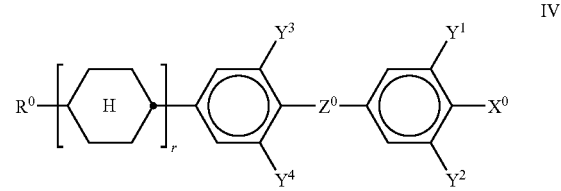

-continued

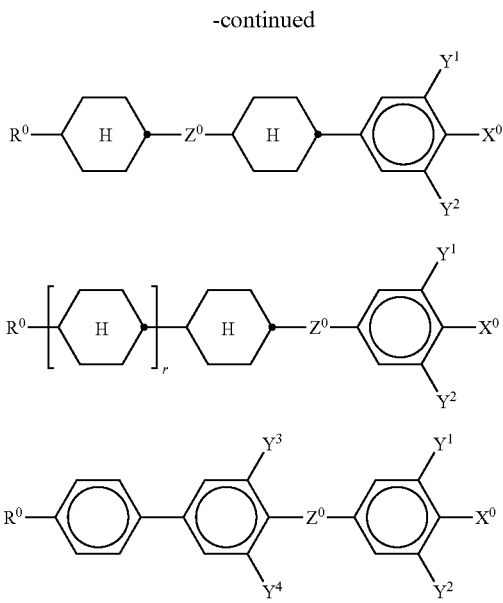

in which the individual radicals have the following meanings:

$R^0$: n-alkyl, alkoxy, oxaalkyl, fluoroalkyl or alkenyl, each having up to 9 carbon atoms, $X^0$: F, Cl, halogenated alkyl, halogenated alkenyl, halogenated alkenyloxy or halogenated alkoxy having from 1 to 6 carbon atoms, $Z^0$: $-C_2H_4-$, $-(CH_2)_4-$, $-CH=CH-$, $-CF=CF-$, $-C_2F_4-$, $-CH_2CF_2-$, $-CF_2CH_2-$, $-CH_2O-$, $-OCH_2-$, $-COO-$, $-OCF_2-$ or $-CF_2O-$, $Y^1$ to $Y^4$: each independently of one another H or F, with the proviso that if $Z^0$ in formula VII is $-CF_2O-$, then at least one of $Y^1$ to $Y^4$ in formula VII is H, r: 0 or 1;

The compounds of formula II are preferably selected of the following formulae

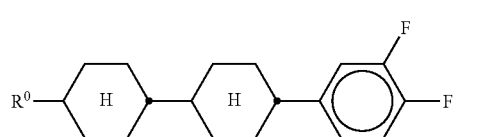

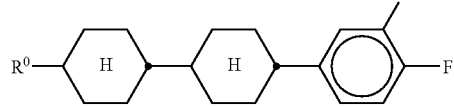

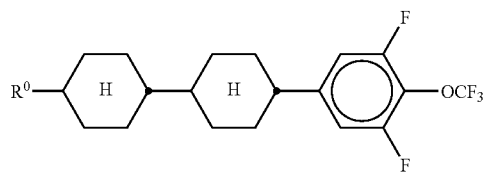

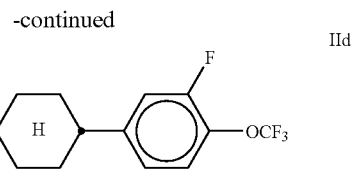

wherein $R^0$ has the meaning given in formula II. Especially preferred are compounds of formula IIa.

The compounds of formula IV are preferably selected of the following formulae

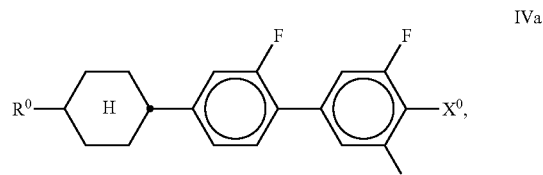

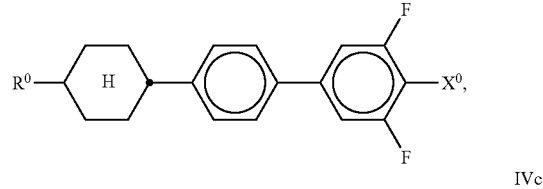

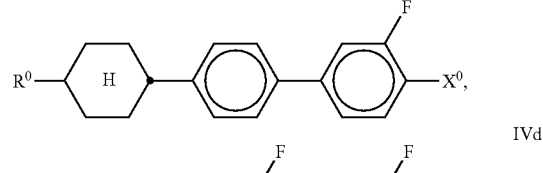

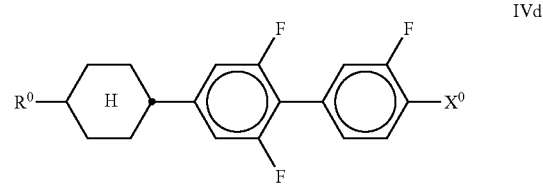

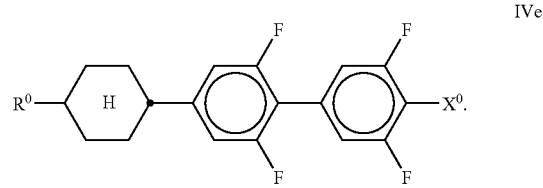

wherein $X^0$ and $R^0$ have the meaning given in formula II and $X^0$ is preferably F or $OCF_3$. Especially preferred are compounds of formula IVa and IVe.

The compounds of formula VI are preferably selected of the following formulae

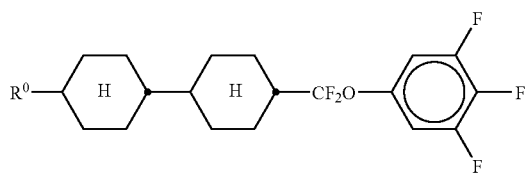

-continued

VIb
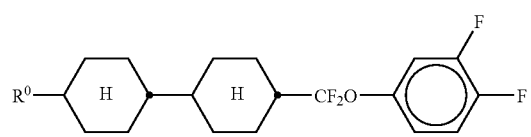

VIc
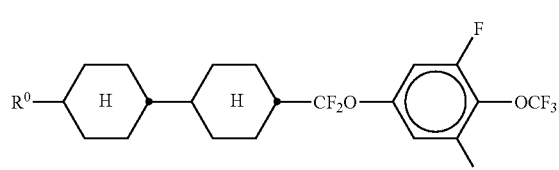

VId
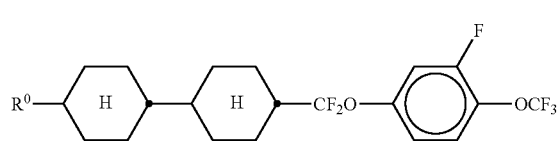

wherein $R^0$ has the meaning given in formula II. Especially preferred are compounds of formula VIa and VIb.

The compounds of formula VII are preferably selected of the following formulae

VIIa
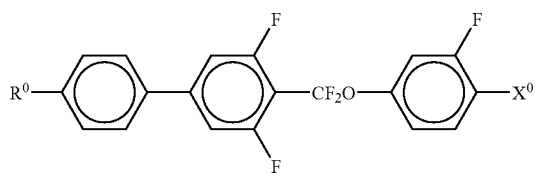

VIIb
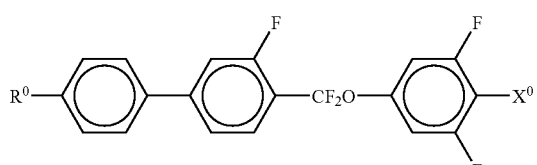

VIIc
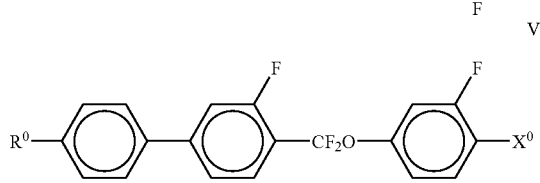

wherein $X^0$ and $R^0$ have the meaning given in formula II and $X^0$ is preferably F or $OCF_3$.

The medium additionally comprises one or more compounds selected of the following formula VIII
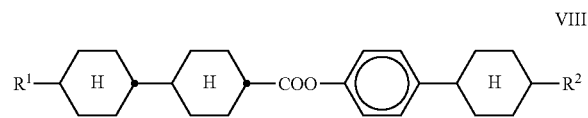

wherein $R^1$ and $R^2$ are as defined in formula IB, and are preferably selected from straight-chain alkyl with 2, 3, 4, 5 or 6 C-atoms.

The medium additionally comprises one or more compounds selected of the following formulae IX
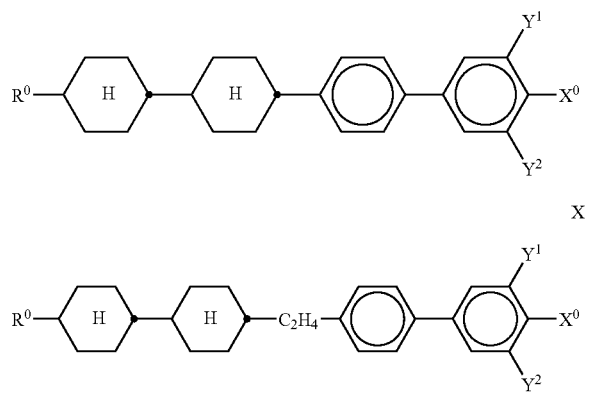

X

XI
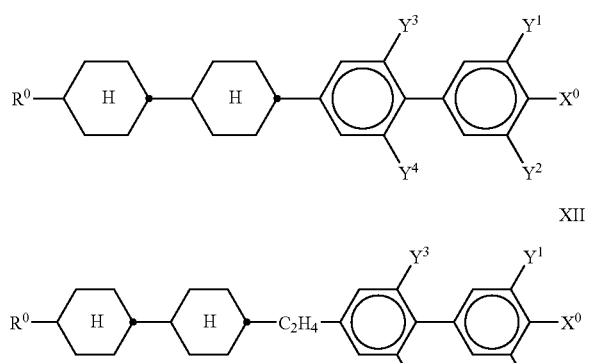

XII
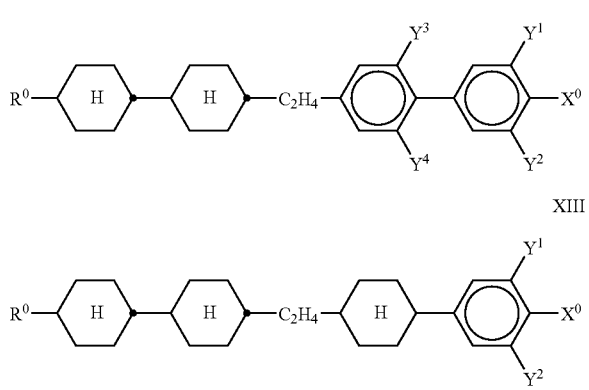

XIII
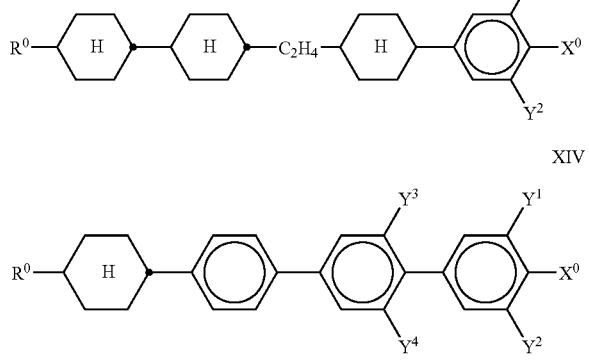

XIV

XV
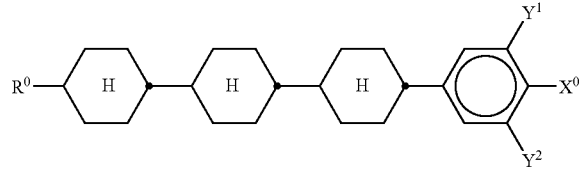

-continued

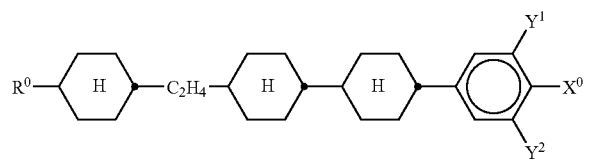

XVI wherein $R^0$, $X^0$ and $Y^{1-4}$ are each, independently of one another, as defined in formulae II-VII. $X^0$ is preferably F, Cl, $CF_3$, $OCF_3$ or $OCHF_2$. $R^0$ is preferably alkyl, oxaalkyl, fluoroalkyl or alkenyl, each having up to 6 carbon atoms.

The medium additionally comprises one or more compounds of the following formula

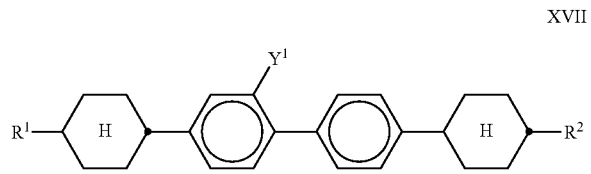

XVII wherein $R^1$ and $R^2$ are as defined in formula IB and $Y^1$ is as defined in formula II. Especially preferred are compounds in which $Y^1$ is F.

The medium additionally comprises one or more compounds selected of the following formulae

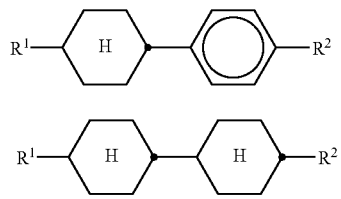

XVIII

XIX wherein $R^1$ and $R^2$ are as defined in formula IB, and are preferably selected from straight-chain alkyl or alkoxy with 1, 2, 3, 4, 5 or 6 C-atoms.

The medium additionally comprises one or more alkenyl compounds of the following formula

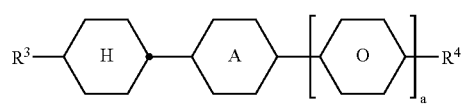

XX wherein
A is 1,4-phenylene or trans-1,4-cyclohexylene,
a is 0 or 1,
$R^3$ is an alkenyl group having from 2 to 9 carbon atoms, and
$R^4$ is as defined for $R^1$ in formula IA.

Particularly preferred alkenyl compounds are those selected of the following formulae:

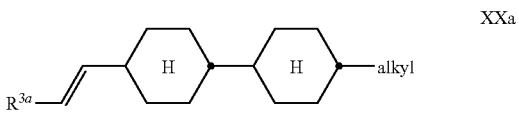

XXa

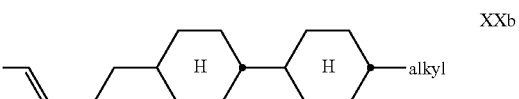

XXb

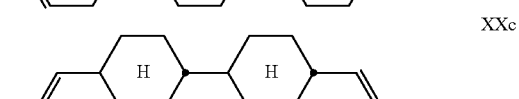

XXc

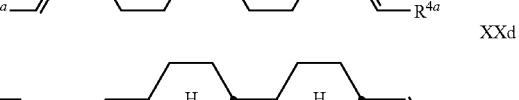

XXd

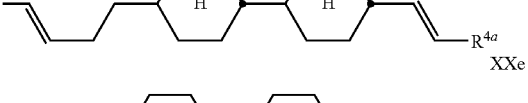

XXe

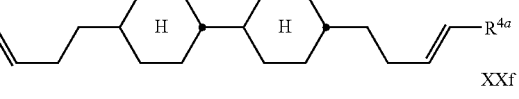

XXf

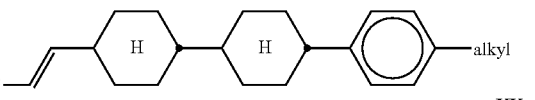

XXg

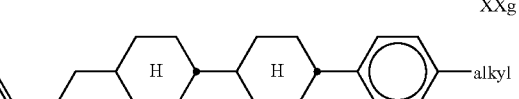

XXh

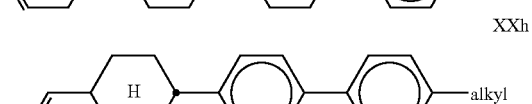

XXi wherein $R^{3a}$ and $R^{4a}$ are independently of each other H, $CH_3$, $C_2H_5$ or n-$C_3H_7$ and alkyl is an alkyl group with 1 to 8 carbon atoms.

Especially preferred are compounds of formula XXa, XXf and XXg, in particular wherein $R^{3a}$ is H or $CH_3$.

The medium additionally comprises one or more alkenyl compounds of the following formula

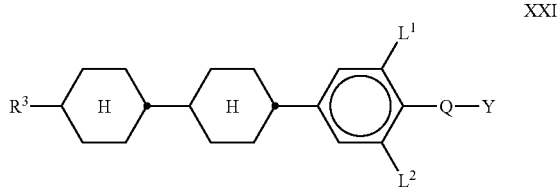

XXI wherein

R³ is an alkenyl group with 2 to 7 carbon atoms,
Q is CF₂, OCF₂, CFH, OCFH or a single bond,
Y is F or Cl, and
L¹ and L² are independently of each other H or F.

Especially preferred are compounds of formula XXI wherein L¹ and/or L² are F and Q-Y is F or OCF₃. Further preferred are compounds of formula XI wherein R³ is 1E-alkenyl or 3E-alkenyl having 2 to 7, preferably 2, 3 or 4 carbon atoms.

Very preferred are compounds of the following formula

XXIa

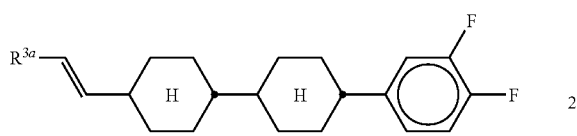

wherein R$^{3a}$ is H, CH₃, C₂H₅ or n-C₃H₇, in particular H or CH₃.

The medium comprises further compounds, preferably selected from the group consisting of the following formulae:

XXII

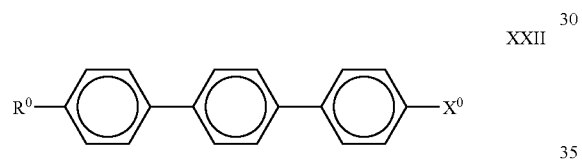

XXIII

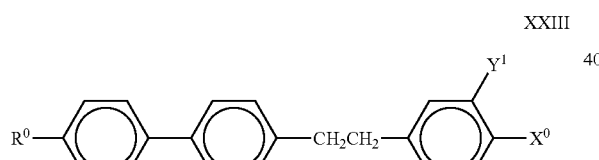

XXIV

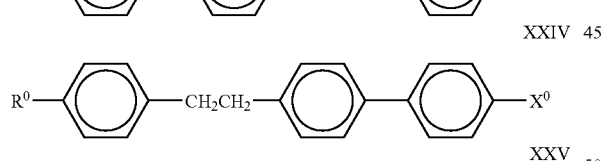

XXV

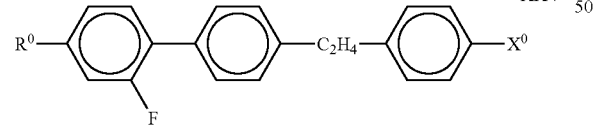

wherein R⁰, X⁰ and Y$^{1-4}$ are each, independently of one another, as defined in formulae II-VII, and the 1,4-phenylene rings may be substituted by CN, chlorine or fluorine. X⁰ is preferably F, Cl, CF₃, OCF₃ or OCHF₂. R⁰ is preferably alkyl, oxaalkyl, fluoroalkyl or alkenyl, each having up to 6 carbon atoms. The 1,4-phenylene rings are preferably mono- or polysubstituted by fluorine atoms.

The medium comprises further compounds, preferably selected from the group consisting of the following formulae:

XXVI

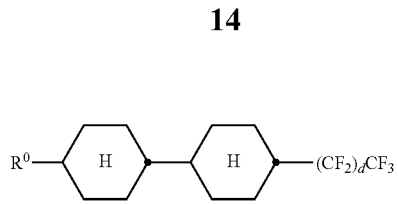

XXVII

XXVIII

XXIX

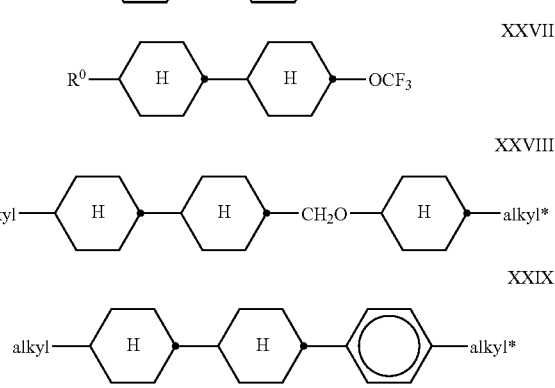

wherein R⁰ is as defined in formulae II-VII, d is 0, 1 or 2, and 'alkyl' and 'alkyl*' are each, independently of one another, a straight-chain or branched alkyl radical having 1-9 carbon atoms. R is preferably alkyl, oxaalkyl, fluoroalkyl or alkenyl, each having up to 6 carbon atoms.

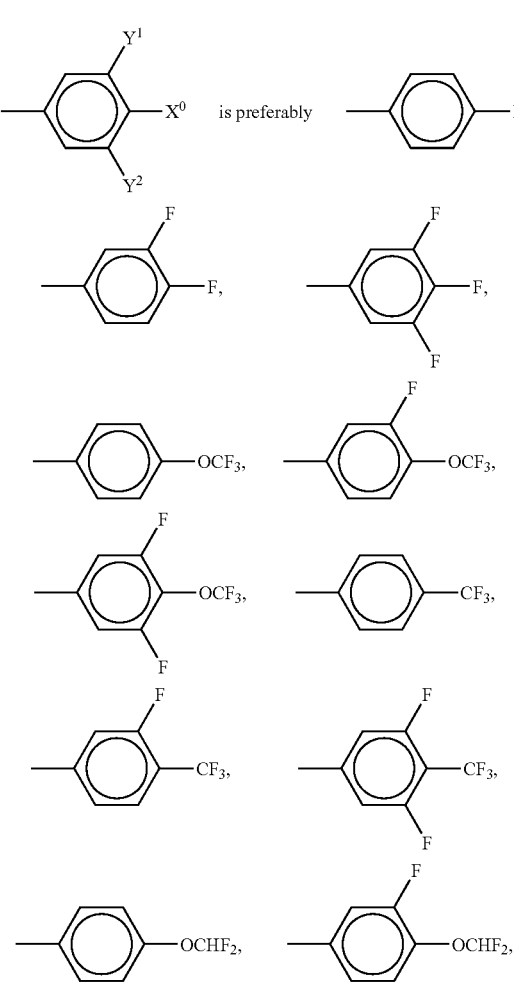

is preferably

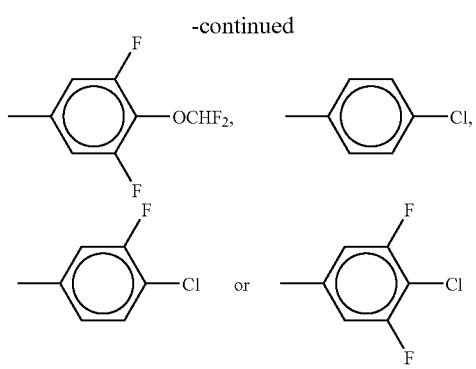

The medium comprises one or more compounds of the formulae II, III, IV, V, VI or VII;

The medium comprises one or more compounds of formula VIII, wherein $R^1$ and $R^2$ are straight-chain alkyl with 2, 3, 4, 5 or 6 C-atoms;

The medium comprises one or more compounds of formula XIX, wherein $R^1$ and $R^2$ are straight-chain alkyl or alkoxy with 1, 2, 3, 4, 5 or 6 C-atoms;

$R^0$ is straight-chain alkyl or alkenyl having from 2 to 7 carbon atoms;

The medium contains from 1 to 6, preferably 1, 2, 3 or 4 compounds of formula IA, most preferably of formula IA1;

The medium contains from 1 to 5, preferably 1, 2 or 3 compounds of formula IB;

The medium contains 1, 2 or 3 compounds of formula IC;

The medium comprises one or more compounds of formula IA, IB, IC, IIa, VIa and VIII, and optionally one or more compounds of formula IVa, VIb and XIX;

The proportion of compounds of the formula IA in the medium is 1-40%, very preferably 10-35% by weight.

The proportion of compounds of the formula IB in the medium is 1-15%, very preferably 1-10%, most preferably 1-8% by weight.

The proportion of compounds of the formula IC in the medium is 1-9%, very preferably 1-6% by weight.

The proportion of compounds of the formula II in the medium is 10-50%, very preferably 15-40% by weight.

The proportion of compounds of the formula VI in the medium is 10-50%, very preferably 15-40% by weight.

The proportion of compounds of the formula IV in the medium is 120%, very preferably 1-10% by weight.

The proportion of compounds of the formula VII in the medium is 1-15%, very preferably 1-10% by weight.

The proportion of compounds of the formula VIII in the medium is 1-12%, very preferably 1-8% by weight.

The proportion of compounds of the formula XIX in the medium is 1-10%, very preferably 1-5% by weight.

The medium essentially consists of compounds selected from the group consisting of the general formulae IA, IB, optionally IC, and II to XXIX.

The term "alkyl" covers straight-chain and branched alkyl groups having 1-7 carbon atoms, in particular the straight-chain groups methyl, ethyl, propyl, butyl, pentyl, hexyl and heptyl. Groups having 2-5 carbon atoms are generally preferred.

The term "alkenyl" covers straight-chain and branched alkenyl groups having 2-7 carbon atoms, in particular the straight-chain groups. Particular alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluoro-butyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. n is preferably =1 and m is preferably from 1 to 6.

It has been found that even a relatively small proportion of compounds of the formula IA, IB and optionally IC mixed with conventional liquid-crystal materials, but in particular with one or more compounds of the formulae II, III, IV, V, VI and/or VII, results in a significant lowering of the threshold voltage and in low birefringence values, with broad nematic phases with low smectic-nematic transition temperatures being observed at the same time, improving the shelf life. Particular preference is given to mixtures which, besides one or more compounds of the formula IA, IB and optionally IC, comprise one or more compounds of the formula VI, in particular compounds of the formula VIa. The compounds of the formulae IA, IB and IC and II to VII are colourless, stable and readily miscible with one another and with other liquid-crystalline materials. Furthermore, the mixtures according to the invention are distinguished by very high clearing points, the values for the rotational viscosity $\gamma_1$ being comparatively low, and by a high LTS.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl or alkoxy radicals. 4-alkenyl radicals, 3-alkenyl radicals and the like generally give lower threshold voltages and smaller values of $k_{33}/k_{11}$ compared with alkyl and alkoxy radicals.

A —$CH_2CH_2$— group generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (greater multiplexability), and vice versa.

The optimum mixing ratio of the compounds of the formulae IA, IB and IC and II+III+IV+V+VI+VII depends substantially on the desired properties, on the choice of the components of the formulae IA, IB, IC, II, III, IV, V, VI and/or VII, and the choice of any other components that may be present. Suitable mixing ratios within the range given above can easily be determined from case to case.

The total amount of compounds of the formulae IA, IB and IC and II to XXIX in the mixtures according to the invention is not crucial. The mixtures can therefore comprise one or more further components for the purposes of optimising various properties. However, the observed effect on the addressing times and the threshold voltage is generally greater, the higher the total concentration of compounds of the formulae IA, IB, IC and II to XXIX.

In a particularly preferred embodiment, the media according to the invention comprise compounds of the formulae II to VII (preferably II and/or VI, in particular IIa and VIa) in which $X^0$ is F, $OCF_3$, $OCHF_2$, $OCH=CF_2$, $OCF=CF_2$ or $OCF_2-CF_2H$. A favourable synergistic effect with the compounds of the formula IA, IB and IC results in particularly advantageous properties. In particular, mixtures comprising compounds of the formula IA, IB, IC and of the formula VIa are distinguished by their low threshold voltages.

Liquid crystal media according to the present invention comprising compounds of formula IA, IB and IC and further comprising one or more compounds of formulae II-XXIX are characterized by low values of the rotational viscosity, high birefringence, good LTS and show fast response times. They are particularly suitable for TV, video and monitor applications.

The individual compounds of the formulae IA, IB and IC and II to XXIX and their sub-formulae which can be used in the media according to the invention are either known or they can be prepared analogously to the known compounds.

The construction of the MLC display according to the invention from polarisers, electrode base plates and surface-treated electrodes corresponds to the conventional construction for displays of this type. The term "conventional construction" is broadly drawn here and also covers all derivatives and modifications of the MLC display, in particular including matrix display elements based on poly-Si TFT or MIM.

A significant difference between the displays according to the invention and the conventional displays based on the twisted nematic cell consists, however, in the choice of the liquid-crystal parameters of the liquid-crystal layer.

The liquid-crystal mixtures which can be used in accordance with the invention are prepared in a manner conventional per se, for example by mixing one or more compounds of formula IA, IB and optionally IC with one or more compounds selected from formulae II-XIX, or with one or more further liquid crystal compounds and/or additives. In general, the desired amount of the components used in the lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature. For example, 0-15% of pleochroic dyes, nanoparticles, stabilizers or chiral dopants can be added. Suitable dopants and stabilizers are shown in table C and D below.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively; n and m are preferably 0, 1, 2, 3, 4, 5, 6 or 7. The coding in Table B is self-evident. In Table A, only the acronym for the parent structure is indicated. In individual cases, the acronym for the parent structure is followed, separated by a dash, by a code for the substituents $R^1$, $R^2$, $L^1$ and $L^2$.

| Code for $R^{1*}$, $R^{2*}$, $L^{1*}$, $L^{2*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| V - n | $CH_2=CH$ | $C_nH_{2n+1}$ | H | H |

Preferred mixture components of the mixture concept according to the invention are given in Tables A and B.

TABLE A

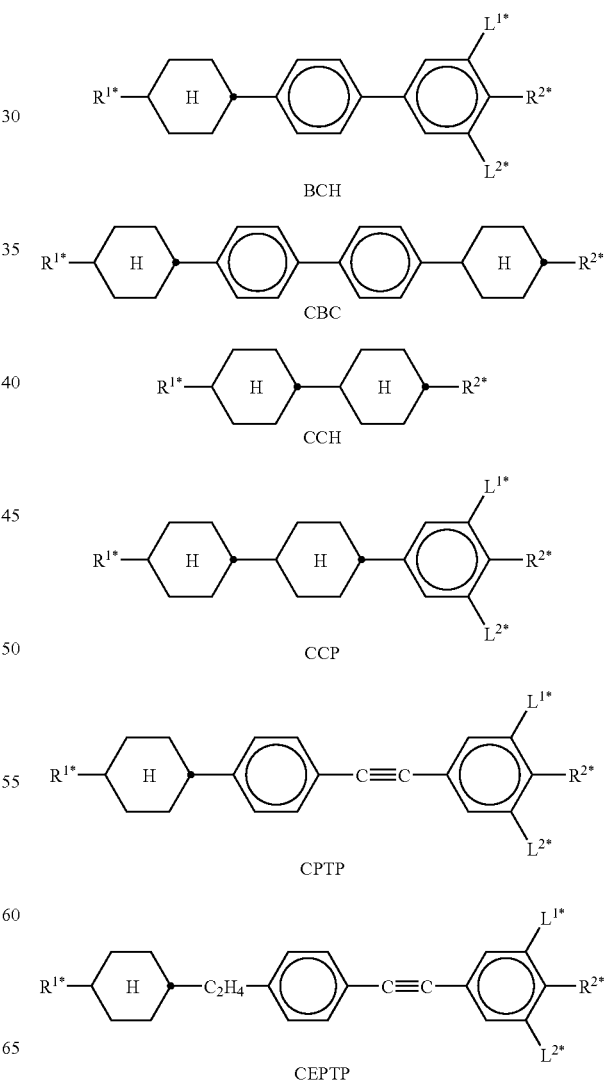

BCH

CBC

CCH

CCP

CPTP

CEPTP

TABLE A-continued
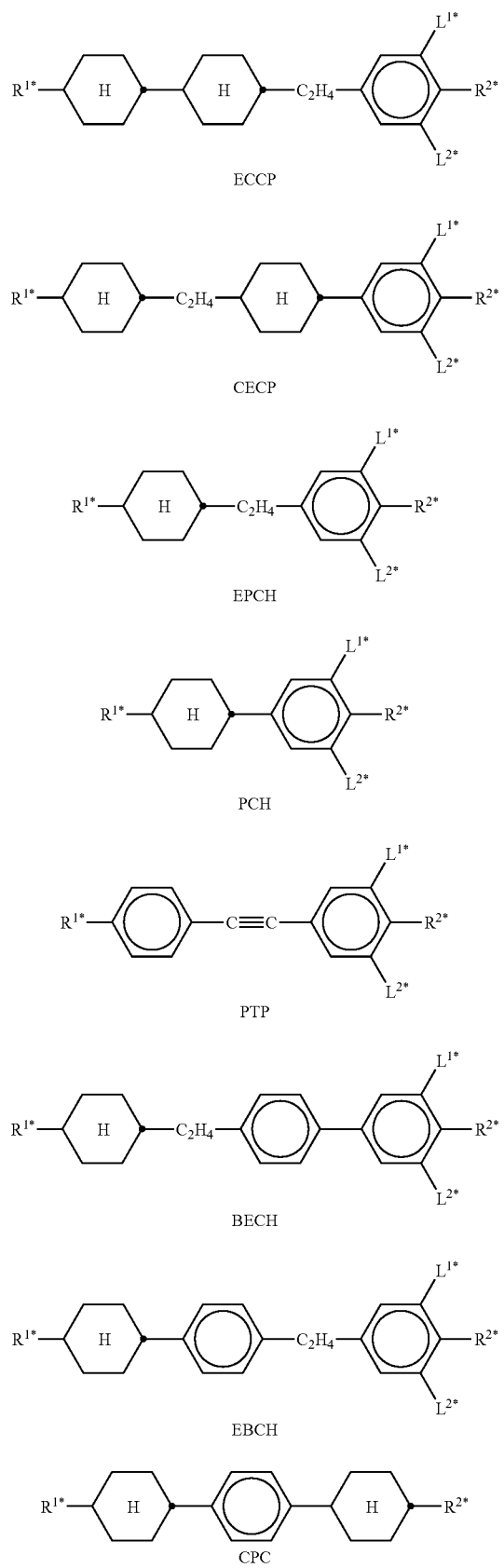
TABLE A-continued
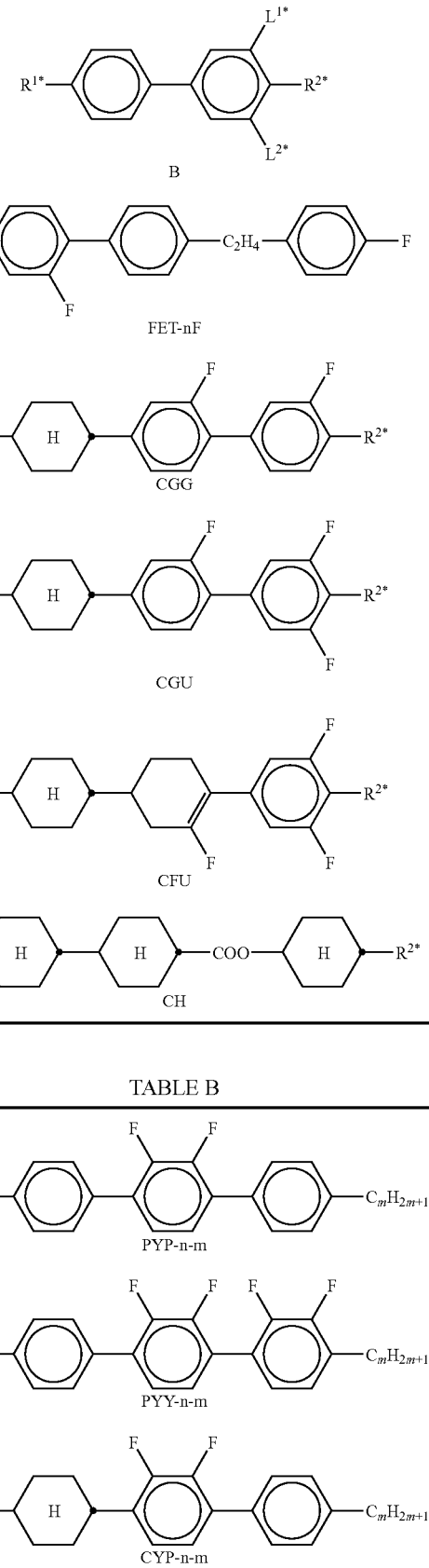
TABLE B

TABLE B-continued

CYY-n-m

BCH-n.Fm

CFU-n-F

CBC-nmF

ECCP-nm

CCZU-n-F

T-nFm

CGU-n-F

CDU-n-F

TABLE B-continued

DCU-n-F

CGG-n-F

CPZG-n-OT

CC-nV-Vm

CCP-Vn-m

CCG-V-F

CCP-nV-m

CC-n-V

CCQU-n-F

CC-n-V1

TABLE B-continued
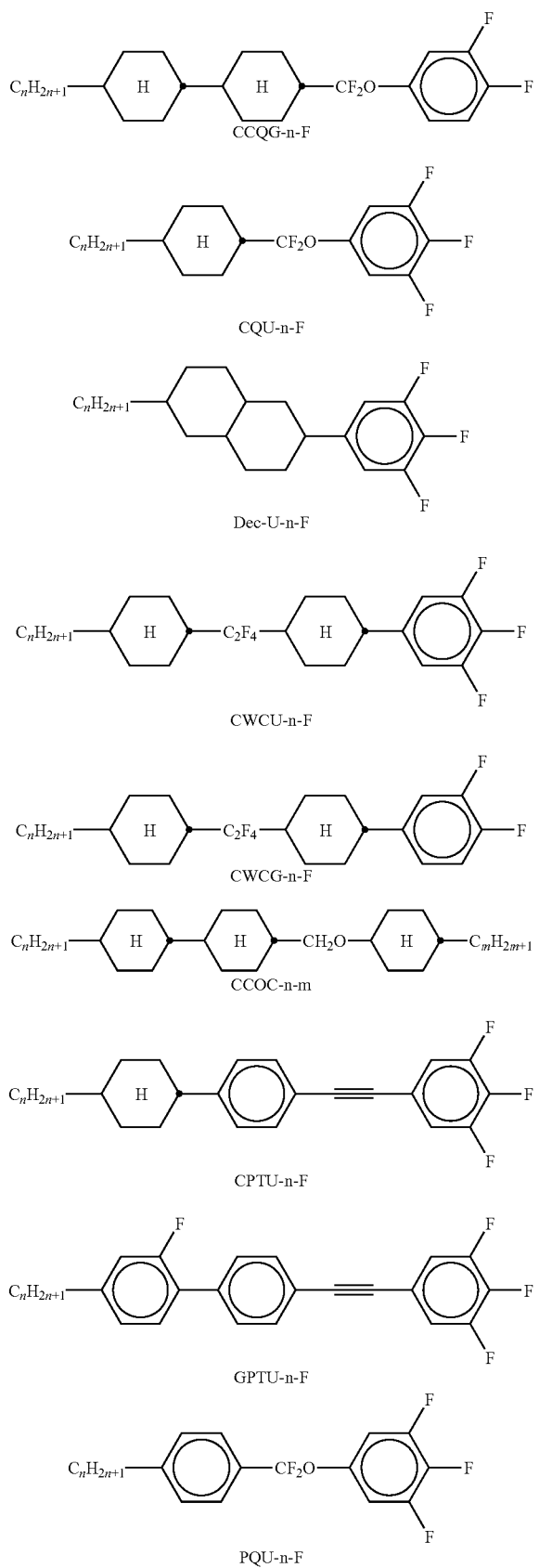
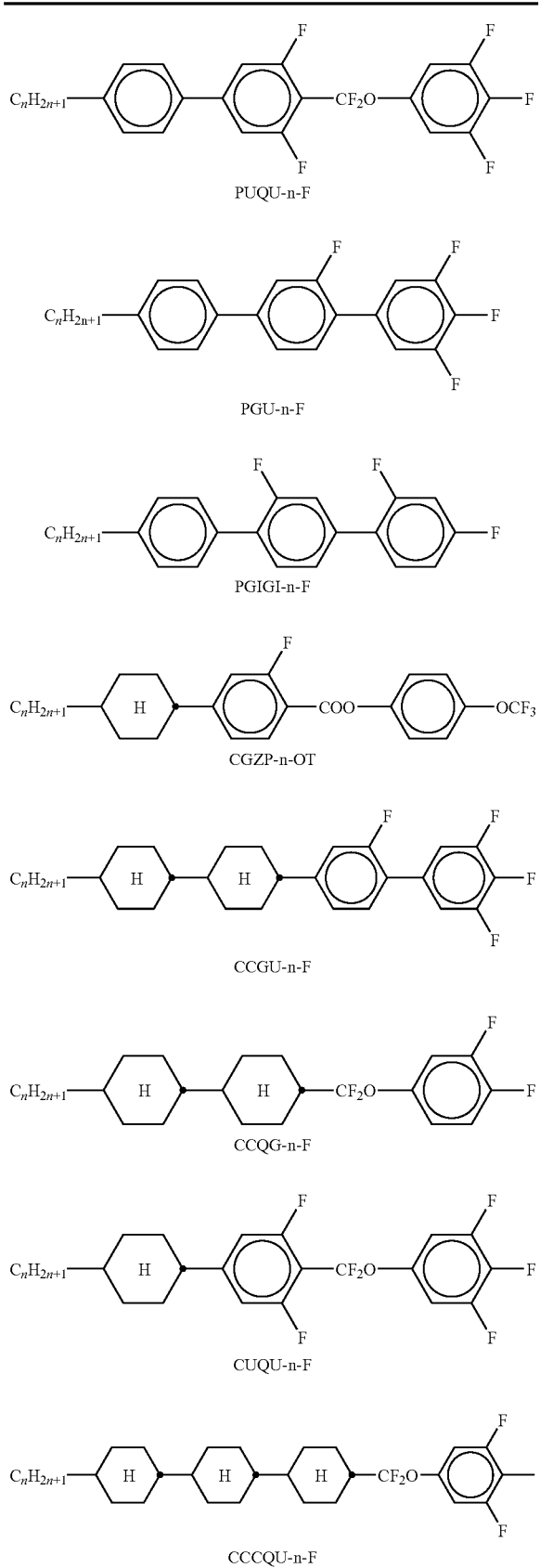

TABLE B-continued
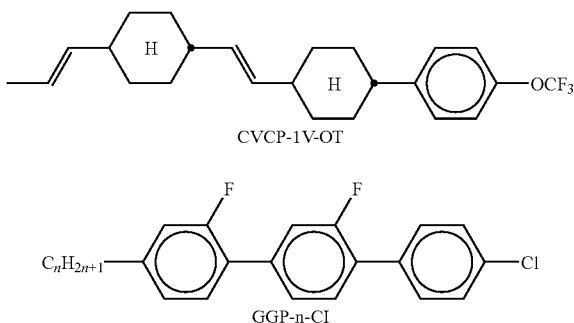
TABLE B-continued
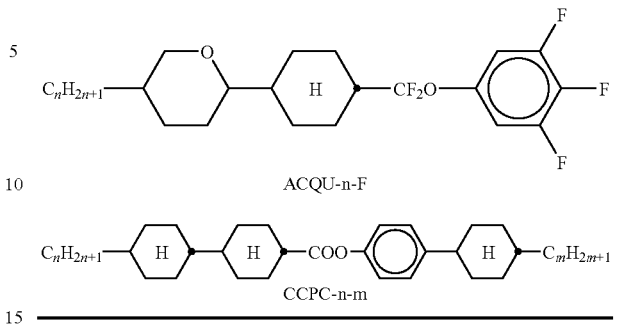
TABLE C
Table C shows possible dopants which are generally added to the compounds according to the invention, preferably in proportions of from 0.1 to 10 wt.-%, very preferably from 0.1 to 6 wt.-%.
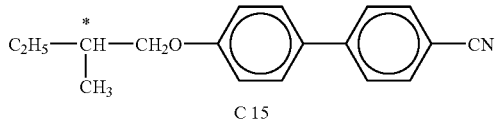
C 15
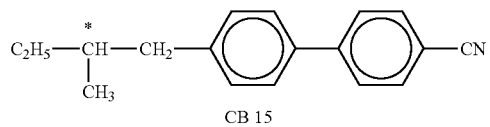
CB 15
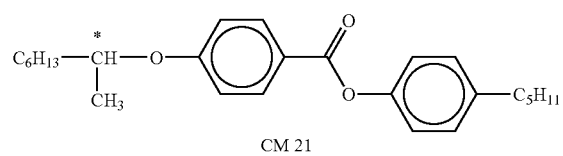
CM 21
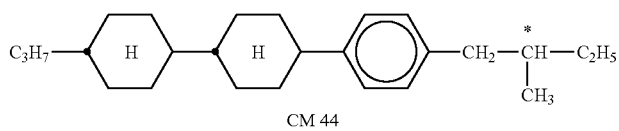
CM 44
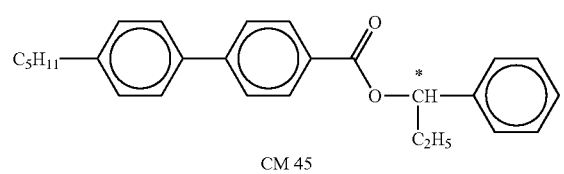
CM 45
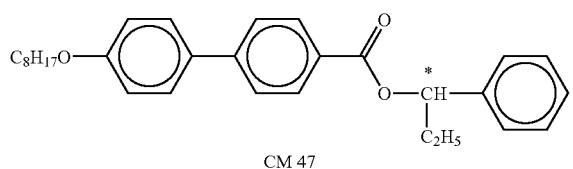
CM 47
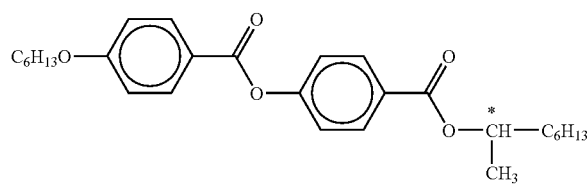

TABLE C-continued
Table C shows possible dopants which are generally added to the compounds according to the invention, preferably in proportions of from 0.1 to 10 wt.-%, very preferably from 0.1 to 6 wt.-%.
R/S-811
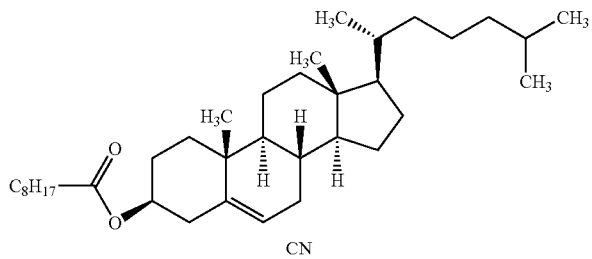
CN
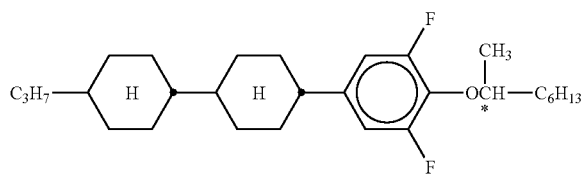
R/S-2011
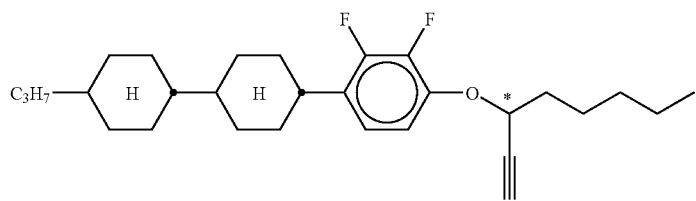
R/S-3011
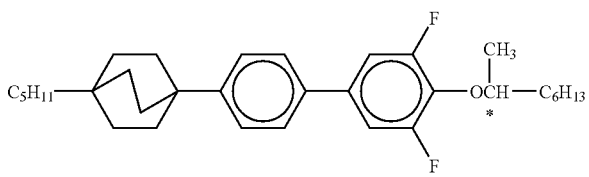
R/S-4011
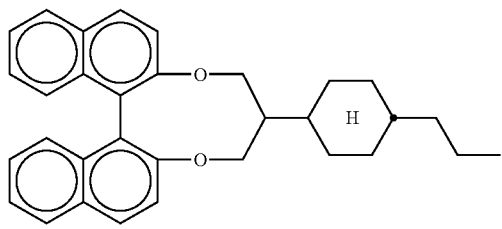
R/S-5011
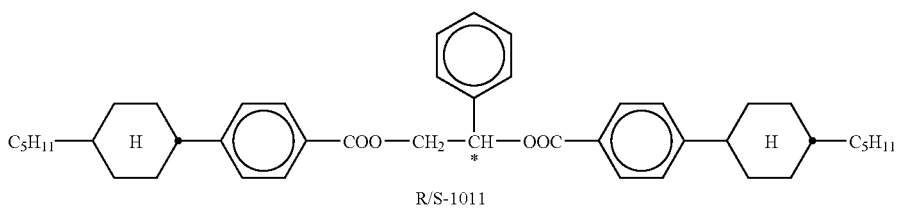
R/S-1011

TABLE D
Stabilisers which can be added, for example, to the mixtures according to the invention are shown below.
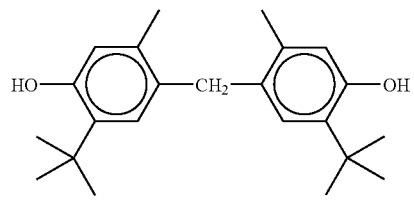
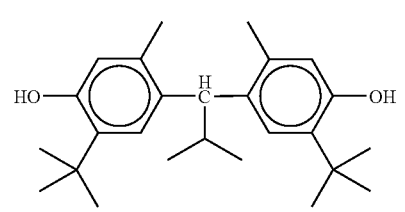
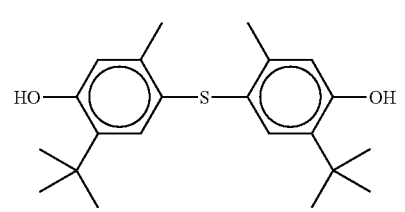
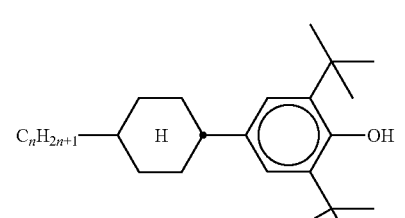
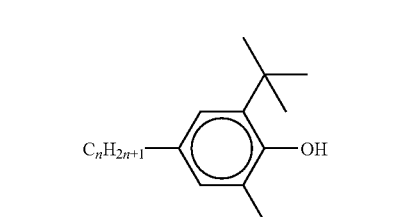
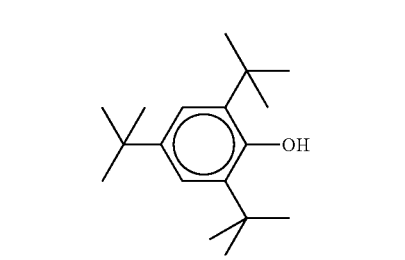
TABLE D-continued
Stabilisers which can be added, for example, to the mixtures according to the invention are shown below.
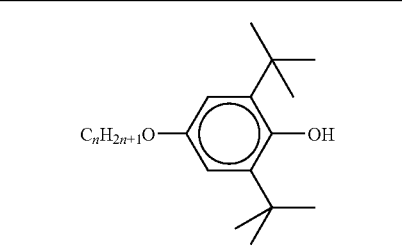
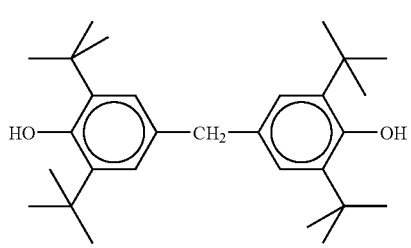
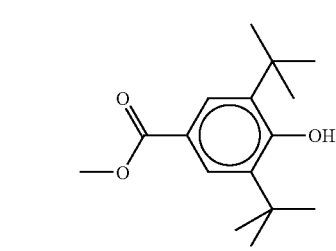
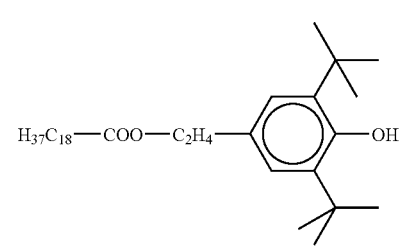
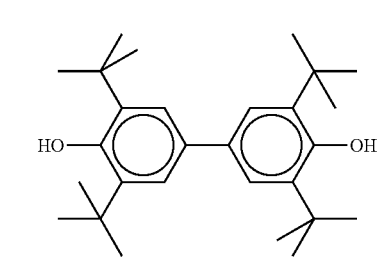

TABLE D-continued
Stabilisers which can be added, for example, to the mixtures according to the invention are shown below.
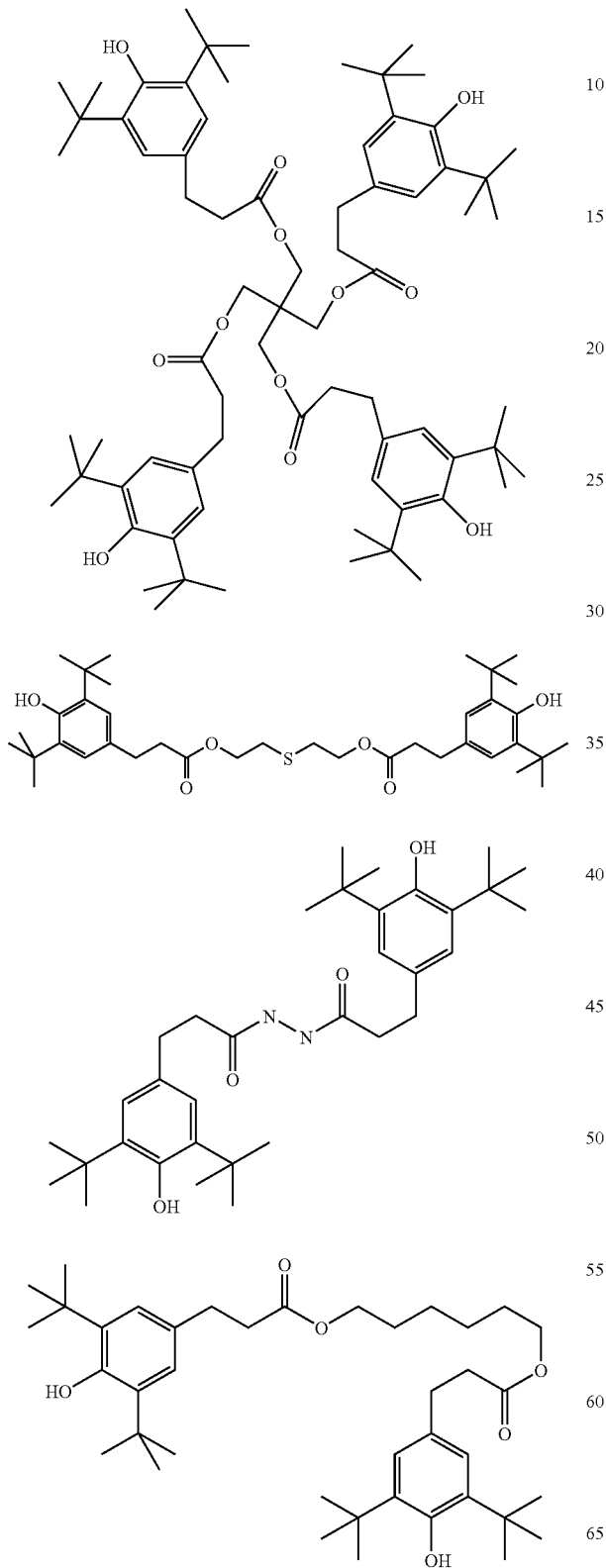
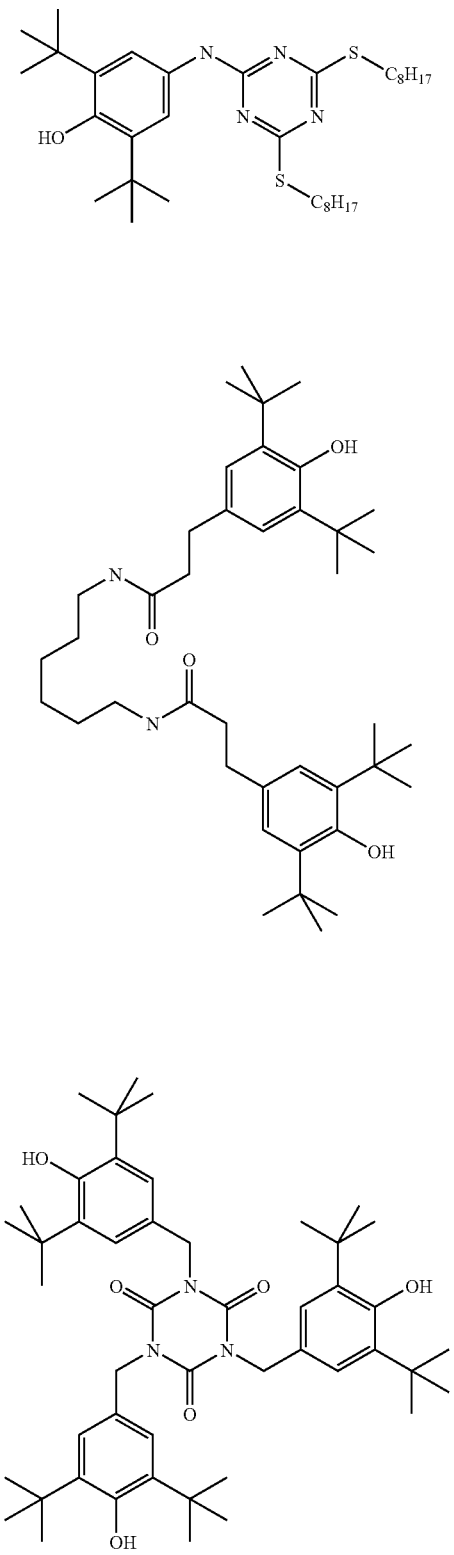

TABLE D-continued
Stabilisers which can be added, for example, to the mixtures according to the invention are shown below.
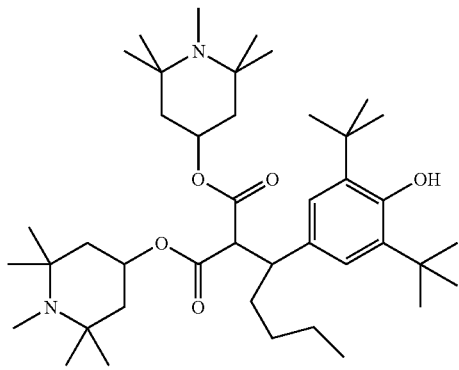
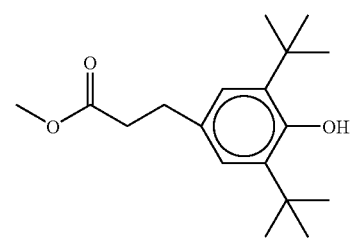
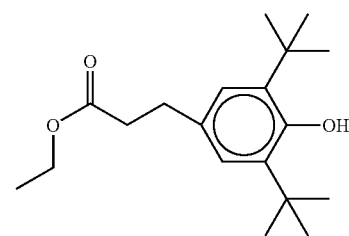
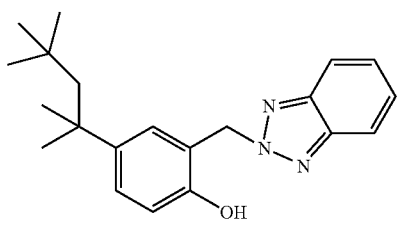
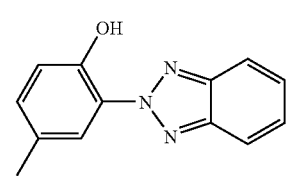
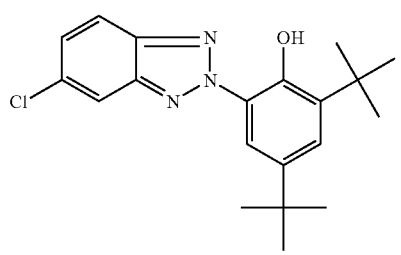
TABLE D-continued
Stabilisers which can be added, for example, to the mixtures according to the invention are shown below.
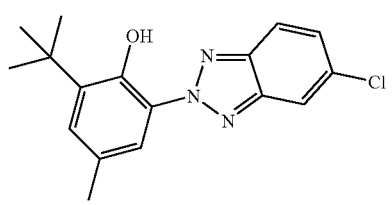
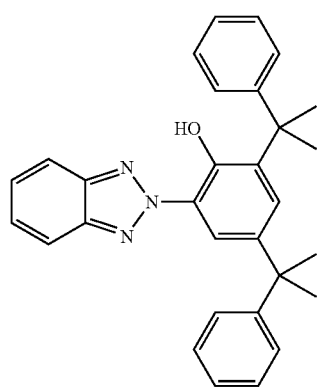
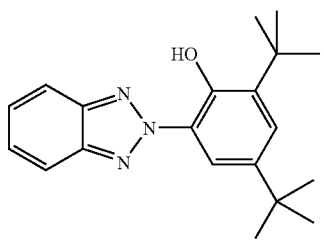
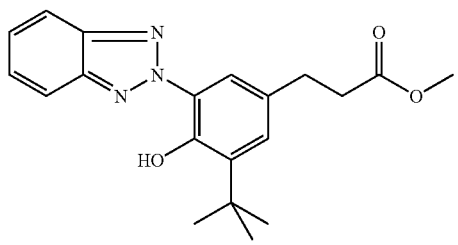
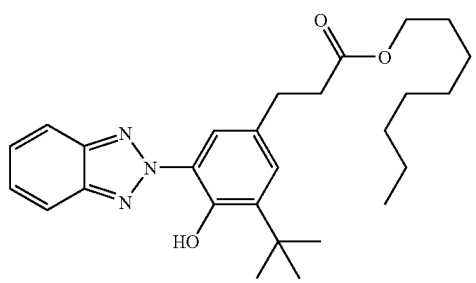

TABLE D-continued

Stabilisers which can be added, for example, to the mixtures according to the invention are shown below.

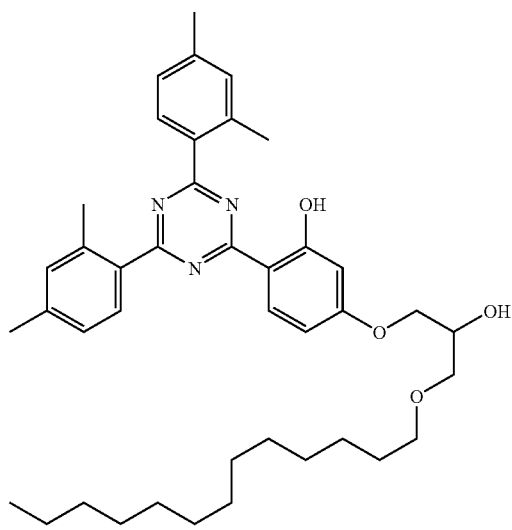

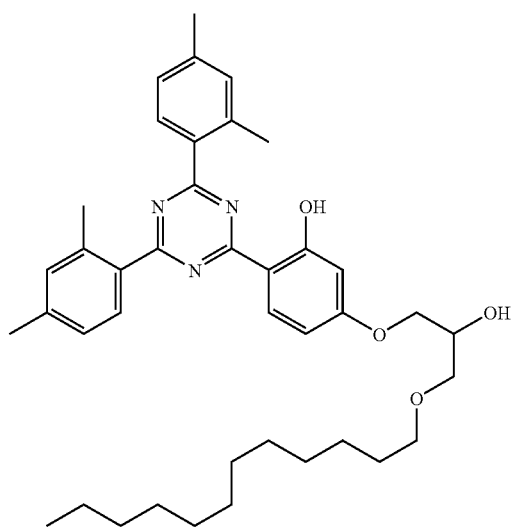

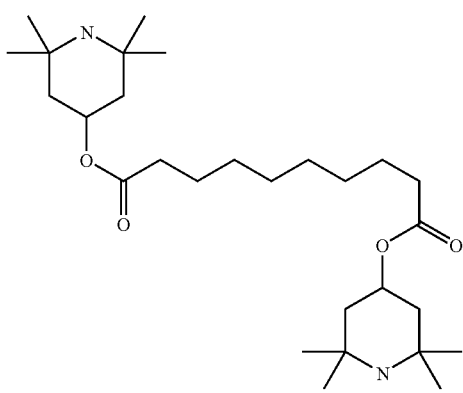

TABLE D-continued

Stabilisers which can be added, for example, to the mixtures according to the invention are shown below.

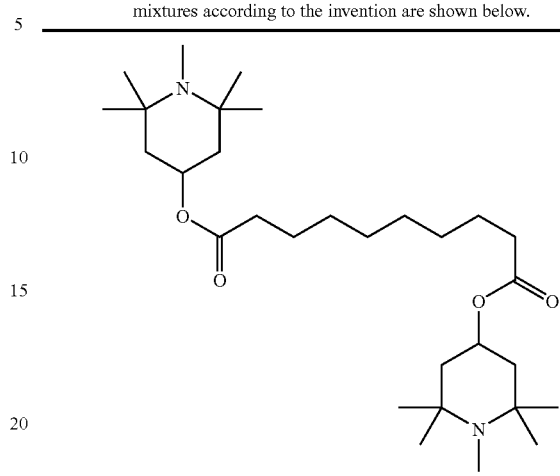

Besides one or more compounds of the formula IA, IB and optionally IC, particularly preferred mixtures comprise one, two, three, four, five or more compounds from Table B.

The following examples are intended to explain the invention without restricting it. Above and below, percentages are percent by weight. All temperatures are given in degrees Celsius. m.p. denotes melting point, cl.p.=clearing point. Furthermore, C=crystalline state, N=nematic phase, S=smectic phase and I=isotropic phase. The data between these symbols represent the transition temperatures. Δn denotes the optical anisotropy and $n_o$ the refractive index (589 nm, 20° C.). The flow viscosity $v_{20}$ (mm$^2$/sec) and the rotational viscosity $\gamma_1$ [mPa·s] were each determined at 20° C. $V_{10}$ denotes the voltage for 10% transmission (viewing angle perpendicular to the plate surface). $t_{on}$ denotes the switch-on time and $t_{off}$ the switch-off time at an operating voltage corresponding to 2 times the value of $V_{10}$. Δε denotes the dielectric anisotropy (Δε=ε$_\parallel$−ε$_\perp$, where ε$_\parallel$ denotes the dielectric constant parallel to the longitudinal molecular axes and ε$_\perp$ denotes the dielectric constant perpendicular thereto). The electro-optical data were measured in a TN cell at the 1st minimum (i.e. at a d·Δn value of 0.5 μm) at 20° C., unless expressly stated otherwise. The optical data were measured at 20° C., unless expressly stated otherwise.

EXAMPLE 1

| | | | |
|---|---|---|---|
| CCP-1F.F.F. | 8.50% | Clearing point [° C.]: | 87.2 |
| CCP-2F.F.F | 8.50% | Δn [589 nm, 20° C.]: | 0.0716 |
| CCP-3F.F.F | 10.00% | | |
| CCP-5F.F.F | 4.50% | | |
| CCQU-2-F | 9.50% | | |
| CCQU-3-F | 9.50% | | |
| CCQU-5-F | 9.50% | | |
| ACQU-2-F | 8.50% | | |
| ACQU-3-F | 8.50% | | |
| ACQU-4-F | 8.50% | | |
| PUQU-3-F | 4.25% | | |
| CCH-301 | 1.50% | | |
| CH-33 | 2.50% | | |
| CH-43 | 0.75% | | |
| CCPC-33 | 3.00% | | |
| CCPC-34 | 2.50% | | |

EXAMPLE 2

| | | | |
|---|---|---|---|
| CCP-1F.F.F | 8.00% | Clearing point [° C.]: | 86.0 |
| CCP-2F.F.F | 8.50% | Δn [589 nm, 20° C.]: | 0.0713 |
| CCP-3F.F.F | 9.00% | | |
| CCP-5F.F.F | 4.00% | | |
| CCQU-2-F | 9.00% | | |
| CCQU-3-F | 9.00% | | |
| CCQU-5-F | 9.00% | | |
| ACQU-2-F | 9.00% | | |
| ACQU-3-F | 9.00% | | |
| ACQU-4-F | 9.00% | | |
| PUQU-3-F | 5.00% | | |
| CCH-501 | 2.50% | | |
| CH-33 | 2.00% | | |
| CH-43 | 1.50% | | |
| CCPC-33 | 3.00% | | |
| CCPC-34 | 2.50% | | |

EXAMPLE 3

| | | | |
|---|---|---|---|
| CCP-1F.F.F | 8.00% | Clearing point [° C.]: | 87.2 |
| CCP-2F.F.F | 8.00% | Δn [589 nm, 20° C.]: | 0.0717 |
| CCP-3F.F.F | 9.00% | Δε [1 kHz, 20° C.]: | +13.2 |
| CCP-5F.F.F | 4.00% | γ1 [m · Pas, 20° C.]: | 205 |
| CCQU-2-F | 8.00% | | |
| CCQU-3-F | 8.00% | | |
| CCQU-5-F | 8.00% | | |
| ACQU-2-F | 8.00% | | |
| ACQU-3-F | 8.00% | | |
| ACQU-4-F | 8.00% | | |
| CGU-2-F | 4.00% | | |
| PUQU-3-F | 2.50% | | |
| CCQG-2-F | 2.50% | | |
| CCQG-3-F | 4.00% | | |
| CH-33 | 2.50% | | |
| CH-43 | 2.50% | | |
| CH-35 | 2.00% | | |
| CCPC-33 | 3.00% | | |

EXAMPLE 4

| | | | |
|---|---|---|---|
| CCP-1F.F.F | 8.00% | Clearing point [° C.]: | 85.0 |
| CCP-2F.F.F | 8.50% | Δn [589 nm, 20° C.]: | 0.0716 |
| CCP-3F.F.F | 9.00% | Δε [1 kHz, 20° C.]: | +13.9 |
| CCP-5F.F.F | 4.50% | γ1 [m · Pas, 20° C.]: | 200 |
| CCQU-2-F | 9.00% | | |
| CCQU-3-F | 9.00% | | |
| CCQU-5-F | 9.00% | | |
| ACQU-2-F | 9.00% | | |
| ACQU-3-F | 9.00% | | |
| ACQU-4-F | 9.00% | | |
| PUQU-3-F | 5.00% | | |
| CCH-501 | 3.00% | | |
| CH-33 | 2.00% | | |
| CCPC-33 | 3.00% | | |
| CCPC-34 | 3.00% | | |

EXAMPLE 5

| | | | |
|---|---|---|---|
| CCP-1F.F.F | 8.00% | Clearing point [° C.]: | 85.1 |
| CCP-2F.F.F | 9.00% | Δn [589 nm, 20° C.]: | 0.0715 |
| CCP-3F.F.F | 9.00% | | |
| CCP-5F.F.F | 4.00% | | |
| CCQU-2-F | 8.50% | | |
| CCQU-3-F | 8.50% | | |
| CCQU-5-F | 8.50% | | |
| ACQU-2-F | 8.00% | | |
| ACQU-3-F | 9.00% | | |
| ACQU-4-F | 9.00% | | |
| PUQU-3-F | 5.00% | | |
| CCQG-3-F | 4.00% | | |
| CCH-501 | 1.50% | | |
| CH-33 | 2.00% | | |
| CH-43 | 2.00% | | |
| CCPC-33 | 2.50% | | |
| CCPC-34 | 1.50% | | |

EXAMPLE 6

| | | | |
|---|---|---|---|
| CCP-1F.F.F | 8.00% | Clearing point [° C.]: | 87.0 |
| CCP-2F.F.F | 9.00% | Δn [589 nm, 20° C.]: | 0.0716 |
| CCP-3F.F.F | 9.00% | Δε [1 kHz, 20° C.]: | +13.8 |
| CCP-5F.F.F | 4.00% | γ1 [m · Pas, 20° C.]: | 202 |
| CCQU-2-F | 8.00% | | |
| CCQU-3-F | 9.00% | | |
| CCQU-5-F | 9.00% | | |
| ACQU-2-F | 8.00% | | |
| ACQU-3-F | 9.00% | | |
| ACQU-4-F | 9.00% | | |
| PUQU-3-F | 5.50% | | |
| CCH-501 | 2.50% | | |
| CH-33 | 2.00% | | |
| CH-43 | 1.50% | | |
| CH-35 | 1.50% | | |
| CCPC-33 | 3.00% | | |
| CCPC-34 | 2.00% | | |

EXAMPLE 7

| | | | |
|---|---|---|---|
| CCP-1F.F.F | 9.00% | Clearing point [° C.]: | 85.1 |
| CCP-2F.F.F | 9.00% | Δn [589 nm, 20° C.]: | 0.0713 |
| CCP-3F.F.F | 10.00% | | |
| CCP-5F.F.F | 4.00% | | |
| CCQU-2-F | 9.00% | | |
| CCQU-3-F | 9.00% | | |
| CCQU-5-F | 9.00% | | |
| ACQU-2-F | 8.00% | | |
| ACQU-3-F | 8.00% | | |
| ACQU-4-F | 8.00% | | |
| CGU-2-F | 7.00% | | |
| CH-33 | 2.00% | | |
| CH-43 | 2.00% | | |
| CH-35 | 2.00% | | |
| CCPC-33 | 2.00% | | |
| CCPC-34 | 2.00% | | |

EXAMPLE 8

| | | | |
|---|---|---|---|
| CCP-1F.F.F | 9.00% | Clearing point [° C.]: | 85.4 |
| CCP-2F.F.F | 9.00% | Δn [589 nm, 20° C.]: | 0.0711 |
| CCP-3F.F.F | 10.00% | | |
| CCP-5F.F.F | 4.00% | | |
| CCQU-2-F | 9.00% | | |
| CCQU-3-F | 9.00% | | |
| CCQU-5-F | 9.00% | | |
| ACQU-2-F | 8.00% | | |
| ACQU-3-F | 8.00% | | |
| ACQU-4-F | 8.00% | | |
| PUQU-3-F | 5.00% | | |
| CCH-301 | 2.00% | | |
| CH-33 | 2.00% | | |
| CH-43 | 2.00% | | |
| CH-35 | 2.00% | | |
| CCPC-33 | 2.00% | | |
| CCPC-34 | 2.00% | | |

EXAMPLE 9

| | | | |
|---|---|---|---|
| CCP-1F.F.F | 9.00% | Clearing point [° C.]: | 87.5 |
| CCP-2F.F.F | 9.00% | Δn [589 nm, 20° C.]: | 0.0717 |
| CCP-3F.F.F | 10.00% | | |
| CCP-5F.F.F | 4.00% | | |
| CCQU-2-F | 9.00% | | |
| CCQU-3-F | 9.00% | | |
| CCQU-5-F | 9.00% | | |
| ACQU-2-F | 8.00% | | |
| ACQU-3-F | 8.00% | | |
| ACQU-4-F | 8.00% | | |
| PUQU-3-F | 5.50% | | |
| CH-33 | 3.00% | | |
| CH-43 | 3.00% | | |
| CH-35 | 2.50% | | |
| CCPC-33 | 3.00% | | |

EXAMPLE 10

| | | | |
|---|---|---|---|
| CCP-1F.F.F | 8.00% | Clearing point [° C.]: | 86.4 |
| CCP-2F.F.F | 9.00% | Δn [589 nm, 20° C.]: | 0.0718 |
| CCP-3F.F.F | 9.00% | | |
| CCP-5F.F.F | 5.00% | | |
| CCQU-2-F | 9.00% | | |
| CCQU-3-F | 9.00% | | |
| CCQU-5-F | 9.00% | | |
| ACQU-2-F | 9.00% | | |
| ACQU-3-F | 9.00% | | |
| ACQU-4-F | 9.00% | | |
| PUQU-3-F | 4.50% | | |
| CCH-301 | 2.00% | | |
| CH-33 | 2.50% | | |
| CCPC-33 | 3.00% | | |
| CCPC-34 | 3.00% | | |

EXAMPLE 11

| | | | |
|---|---|---|---|
| CCP-1F.F.F | 9.00% | Clearing point [° C.]: | 87.1 |
| CCP-2F.F.F | 9.00% | Δn [589 nm, 20° C.]: | 0.0716 |
| CCP-3F.F.F | 10.00% | | |
| CCP-5F.F.F | 4.00% | | |
| CCQU-2-F | 10.00% | | |
| CCQU-3-F | 10.00% | | |
| CCQU-5-F | 10.00% | | |
| ACQU-2-F | 8.00% | | |
| ACQU-3-F | 8.00% | | |
| ACQU-4-F | 8.00% | | |
| PUQU-3-F | 4.00% | | |
| CCH-301 | 1.50% | | |
| CH-33 | 3.00% | | |
| CCPC-33 | 3.00% | | |
| CCPC-34 | 2.50% | | |

EXAMPLE 12

| | | | |
|---|---|---|---|
| CCP-1F.F.F | 8.00% | Clearing point [° C.]: | 87.2 |
| CCP-2F.F.F | 8.00% | Δn [589 nm, 20° C.]: | 0.0716 |
| CCP-3F.F.F | 10.00% | Δε [1 kHz, 20° C.]: | +14.0 |
| CCP-5F.F.F | 5.00% | γ1 [m · Pas, 20° C.]: | 208 |
| CCQU-2-F | 9.00% | | |
| CCQU-3-F | 9.00% | | |
| CCQU-5-F | 9.00% | | |
| ACQU-2-F | 9.00% | | |
| ACQU-3-F | 9.00% | | |
| ACQU-4-F | 9.00% | | |
| PUQU-3-F | 4.50% | | |
| CCH-301 | 1.50% | | |
| CH-33 | 2.00% | | |
| CH-43 | 1.50% | | |
| CCPC-33 | 3.00% | | |
| CCPC-34 | 2.50% | | |

The preceding examples can be repeated with similar success by substituting the generically or specifically described reactants and/or operating conditions of this invention for those used in the preceding examples.

The entire disclosures of all applications, patents and publications, cited herein and of corresponding European application No. 06800715.0, filed Jan. 13, 2006 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid crystal medium comprising
1-30% by weight of one or more compounds of formula IA,
1-10% by weight of one or more compounds of formula IB,
0-9% by weight of one or more compounds of formula IC,

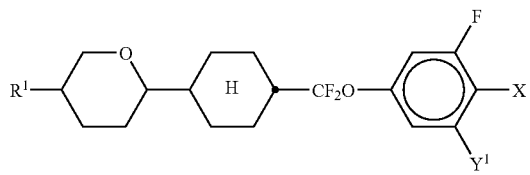

IA

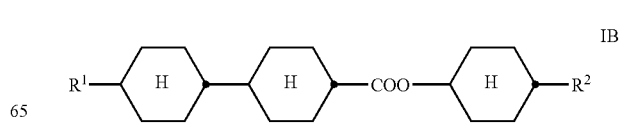

IB

-continued

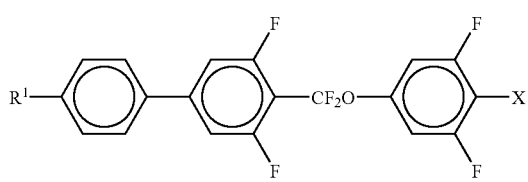
IC wherein
R¹ and R² are each, independently of one another, an alkyl radical having 1 to 12 carbon atoms which is unsubstituted, monosubstituted by CF₃ or at least monosubstituted by halogen, wherein one or more CH₂ groups are optionally, in each case independently of one another, replaced by —O—, —S—,

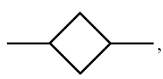,

—CH=CH—, —C≡C—, —CO—, —CO—O—, —O—CO— or —O—CO—O— in such a way that O atoms are not linked directly to one another,
Y¹ is H or F,
X is F, Cl or a halogenated alkyl, alkenyl, alkoxy or alkenyloxy radical having up to 6 carbon atoms, and
r is 1 or 2,
and wherein the medium has a birefringence at 20° C. that is lower than 0.08, and wherein the medium does not contain a compound comprising a cyano group.

2. A medium according to claim 1, comprising one or more compounds of the following formulae

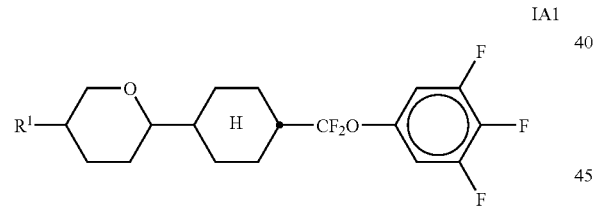
IA1

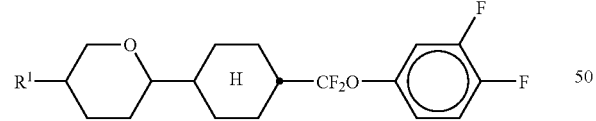
IA2

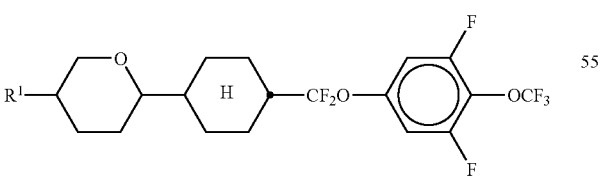
IA3

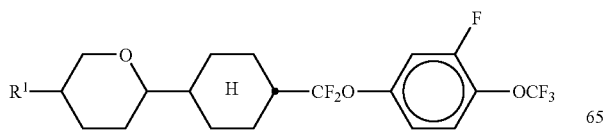
IA4 wherein R¹ is an alkyl radical having 1 to 12 carbon atoms which is unsubstituted, monosubstituted by CF₃ or at least monosubstituted by halogen, wherein one or more CH₂ groups are optionally, in each case independently of one another, replaced by —O—, —S—,

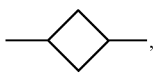,

—CH=CH—, —C≡C—, —CO—, —CO—O—, —O—CO— or —O—CO—O— in such a way that O atoms are not linked directly to one another.

3. A medium according to claim 1, further comprising one or more compounds selected from compounds of formulae II, III, IV, V, VI and VII

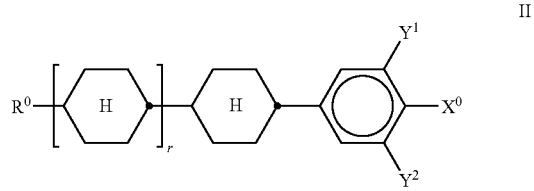
II

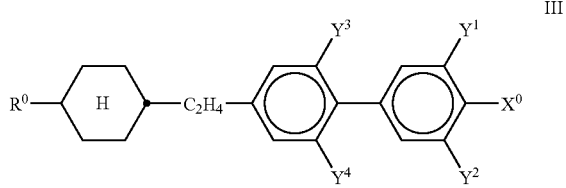
III

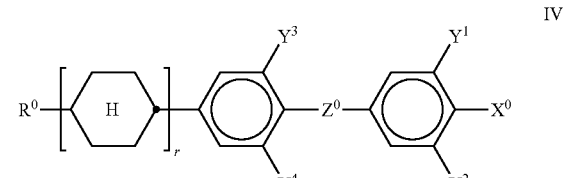
IV

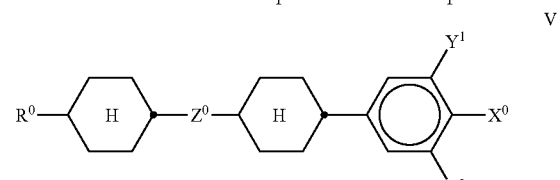
V

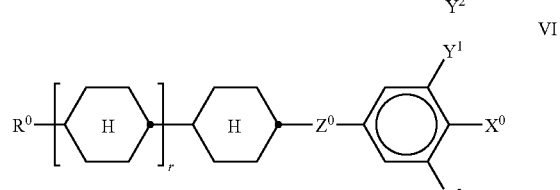
VI

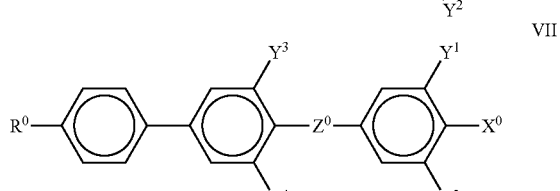
VII wherein
R⁰ is n-alkyl, alkoxy, oxaalkyl, fluoroalkyl or alkenyl, each having up to 9 carbon atoms, X⁰ is F, Cl, halogenated alkyl, halogenated alkenyl, halogenated alkenyloxy or halogenated alkoxy having 1 to 6 carbon atoms, Z⁰ is —C$_2$H$_4$—, —(CH$_2$)$_4$—, —CH=CH—, —CF=CF—, —C$_2$F$_4$—, —CH$_2$CF$_2$—, —CF$_2$CH$_2$—, —CH$_2$O—, —OCH$_2$—, —COO—, —OCF$_2$— or —CF$_2$O—, Y¹ to Y⁴ are each, independently of one another, H or F, and r is 0 or 1, with the proviso that if Z⁰ in formula VII is —CF$_2$O—, then at least one of Y¹ to Y⁴ in formula VII is H.

4. A medium according to claim 1, further comprising one or more compounds of the following formulae

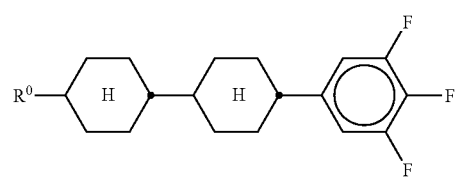

IIa

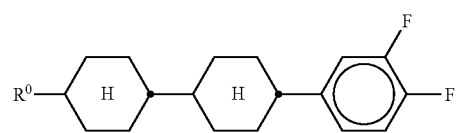

IIb

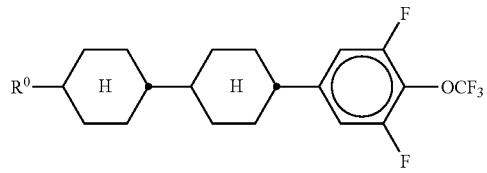

IIc

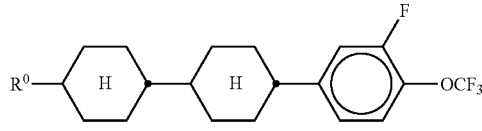

IId wherein R⁰ is n-alkyl, alkoxy, oxaalkyl, fluoroalkyl or alkenyl, each having up to 9 carbon atoms.

5. A medium according to claim 1, further comprising one or more compounds of the following formulae

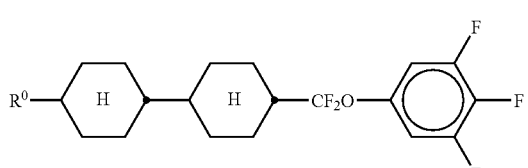

VIa

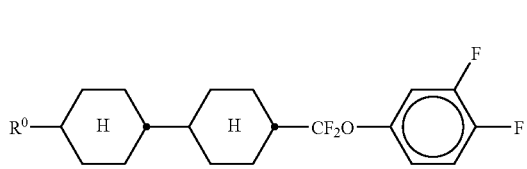

VIb

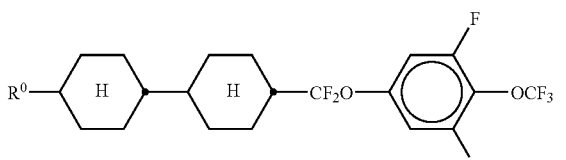

VIc

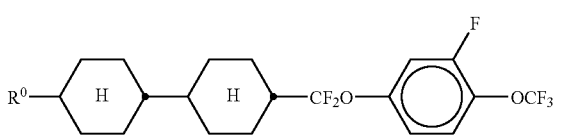

VId wherein R⁰ is n-alkyl, alkoxy, oxaalkyl, fluoroalkyl or alkenyl, each having up to 9 carbon atoms.

6. A medium according to claim 1, further comprising one or more compounds of the following formulae

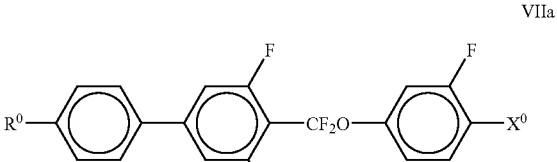

VIIa

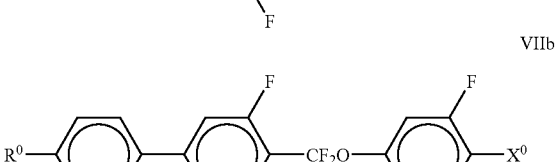

VIIb

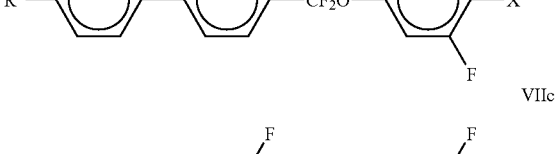

VIIc wherein

X⁰ is F, Cl, halogenated alkyl, halogenated alkenyl, halogenated alkenyloxy or halogenated alkoxy having 1 to 6 carbon atoms, and R⁰ is n-alkyl, alkoxy, oxaalkyl, fluoroalkyl or alkenyl, each having up to 9 carbon atoms.

7. A medium according to claim 1, further comprising one or more compounds of the following formula

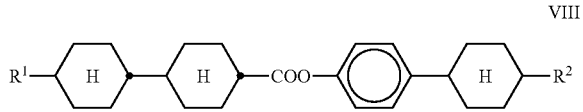

VIII

R¹ and R² are each, independently of one another, an alkyl radical having 1 to 12 carbon atoms which is unsubstituted, monosubstituted by CF$_3$ or at least mono substituted by halogen, wherein one or more CH₂ groups are optionally, in each case independently of one another, replaced by —O—, —S—,

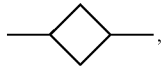

—CH=CH—, —C≡C—, —CO—, —CO—O—, —O—CO— or —O—CO—O— in such a way that O atoms are not linked directly to one another.

8. A medium according to claim 1, comprising one or more compounds of formulae IA, IB, IC, of IIa,

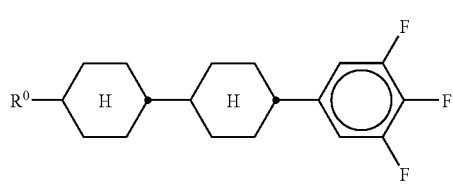

wherein R⁰ is n-alkyl, alkoxy, oxaalkyl, fluoroalkyl or alkenyl, each having up to 9 carbon atoms, of VIa,

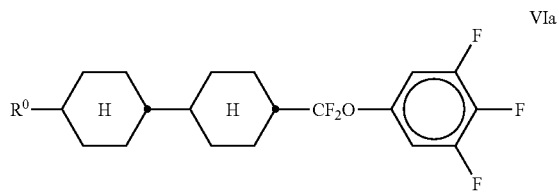

wherein R⁰ is n-alkyl, alkoxy, oxaalkyl, fluoroalkyl or alkenyl, each having up to 9 carbon atoms, and of VIII,

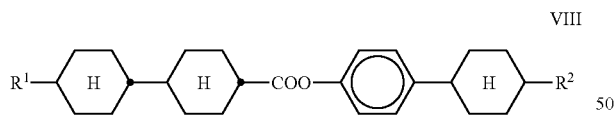

R¹ and R² are each, independently of one another, an alkyl radical having 1 to 12 carbon atoms which is unsubstituted, monosubstituted by CF₃ or at least mono substituted by halogen, wherein one or more CH₂ groups are optionally, in each case independently of one another, replaced by —O—, —S—,

—CH=CH—, —C≡C—, —CO—, —CO—O—, —O—CO— or —O—CO—O— in such a way that O atoms are not linked directly to one another, and optionally one or more compounds of formula IVa,

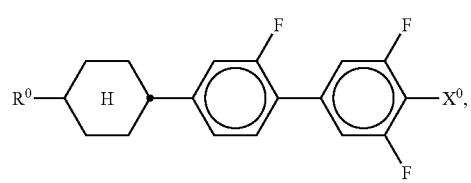

wherein
X⁰ is F, Cl, halogenated alkyl, halogenated alkenyl, halogenated alkenyloxy or halogenated alkoxy having 1 to 6 carbon atoms, and
R⁰ is n-alkyl, alkoxy, oxaalkyl, fluoroalkyl or alkenyl, each having up to 9 carbon atoms,
of VIb,

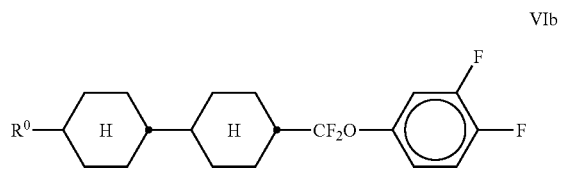

wherein R⁰ is n-alkyl, alkoxy, oxaalkyl, fluoroalkyl or alkenyl, each having up to 9 carbon atoms,
and of XIX,

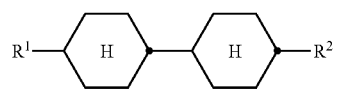

R¹ and R² are each, independently of one another, an alkyl radical having 1 to 12 carbon atoms which is unsubstituted, monosubstituted by CF₃ or at least monosubstituted by halogen, wherein one or more CH₂ groups are optionally, in each case independently of one another, replaced by —O—, —S—,

—CH=CH—, —C≡C—, —CO—, —CO—O—, —O—CO— or —O—CO—O— in such a way that O atoms are not linked directly to one another.

9. A medium according to claim 3, comprising
1-30% by weight of compounds of formula IA,
1-10% by weight of compounds of formula IB,
1-9% by weight of compounds of formula IC,
10-50% by weight of compounds of formula II,
10-50% by weight of compounds of formula VI.

10. A medium according to claim 6, wherein X⁰ is F or OCF₃.

11. A medium according to claim 1, wherein R¹ and R² in formulae IA, IB and/or IC are straight-chain alkyl or alkoxy with 1 to 12 C-atoms.

12. A medium according to claim 1, wherein the medium has a birefringence at 20° C. that is lower than 0.075.

13. A medium according to claim 1, wherein the medium has a birefringence at 20° C. that is from 0.06 to 0.074.

14. A medium according to claim 1, wherein the medium has a birefringence at 20° C. that is from 0.07 to 0.073.

15. An electro-optical liquid crystal display containing a liquid crystal medium according to claim 1.

16. A process of preparing a medium according to claim 1, comprising mixing one or more compounds of formula IA and IB and optionally IC.

17. A liquid crystal medium consisting essentially of 1-30% by weight of one or more compounds of formula IA, 1-10% by weight of one or more compounds of formula IB, 0-9% by weight of one or more compounds of formula IC, IA
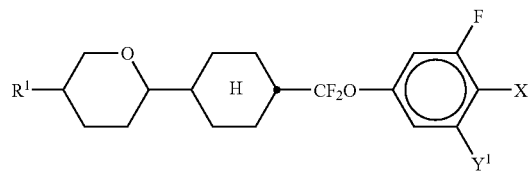

IB
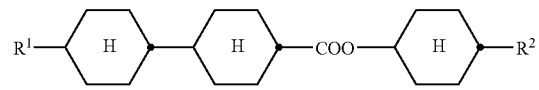

IC
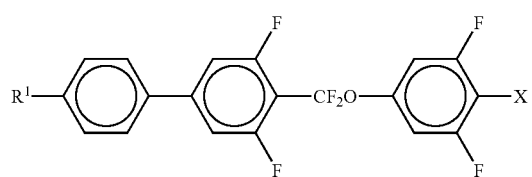

wherein $R^1$ and $R^2$ are each, independently of one another, an alkyl radical having 1 to 12 carbon atoms which is unsubstituted, monosubstituted by CN or $CF_3$ or at least monosubstituted by halogen, wherein one or more $CH_2$ groups are optionally, in each case independently of one another, replaced by —O—, —S—,

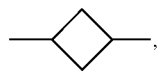

—CH=CH—, —C≡C—, —CO—, —CO—O—, —O—CO— or —O—CO—O— in such a way that O atoms are not linked directly to one another, $Y^1$ is H or F, X is F, Cl or a halogenated alkyl, alkenyl, alkoxy or alkenyloxy radical having up to 6 carbon atoms, and r is 1 or 2, and wherein the medium has a birefringence at 20° C. that is lower than 0.08, and compounds selected from the group consisting of compounds of formulae II to XXIX II
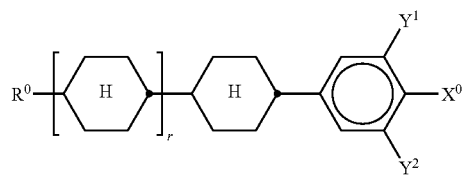

III
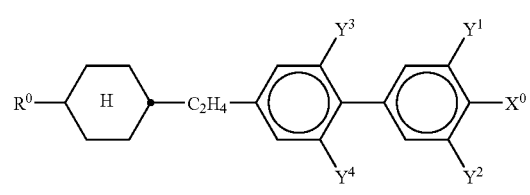

IV
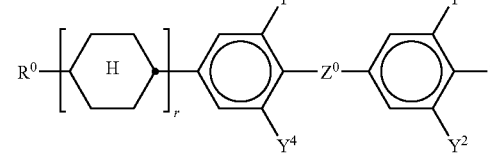

V
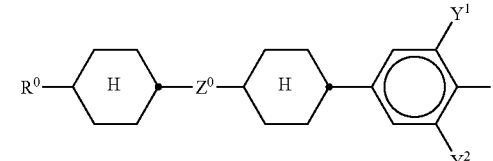

VI
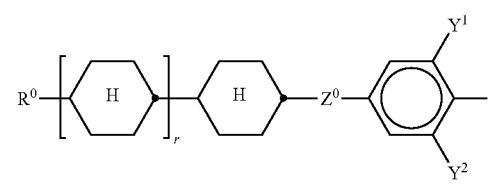

VII
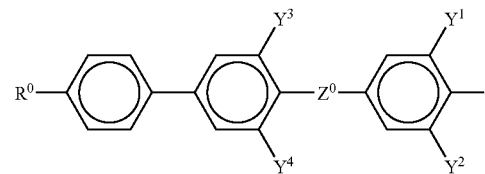

wherein in compounds of formulae II to VII $R^0$ is n-alkyl, alkoxy, oxaalkyl, fluoroalkyl or alkenyl, each having up to 9 carbon atoms, $X^0$ is F, Cl, halogenated alkyl, halogenated alkenyl, halogenated alkenyloxy or halogenated alkoxy having from 1 to 6 carbon atoms, $Z^0$ is —$C_2H_4$—, —$(CH_2)_4$—, —CH=CH—, —CF=CF—, —$C_2F_4$—, —$CH_2CF_2$—, —$CF_2CH_2$—, —$CH_2O$—, —$OCH_2$—, —COO—, —$OCF_2$— or —$CF_2O$—, $Y^1$ to $Y^4$ are, each independently of one another, H or F, with the proviso that if $Z^0$ in formula VII is —$CF_2O$—, then at least one of $Y^1$ to $Y^4$ in formula VII is H, and r is 0 or 1;

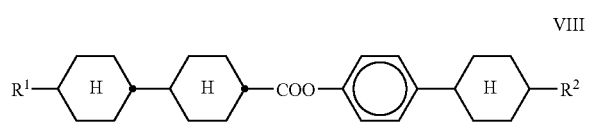

VIII wherein in compounds of formulae VIII
R$^1$ and R$^2$ are as defined in formula IB;

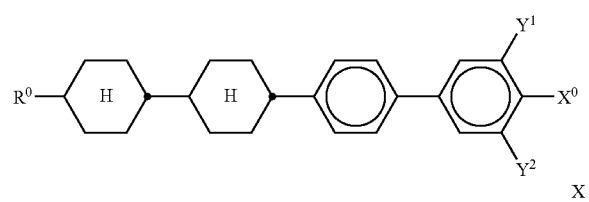

IX

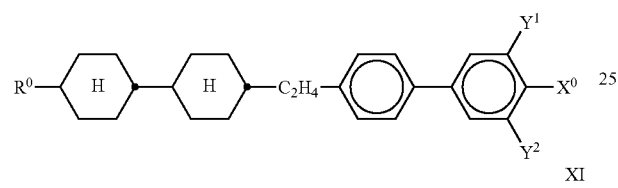

X

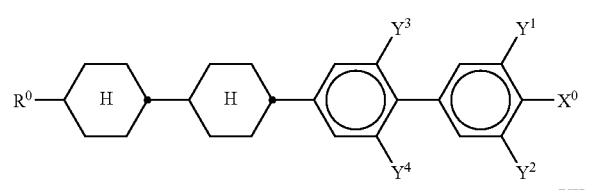

XI

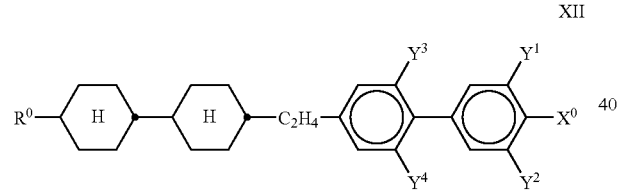

XII

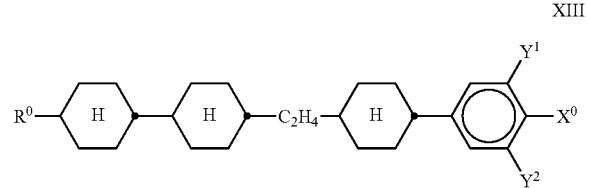

XIII

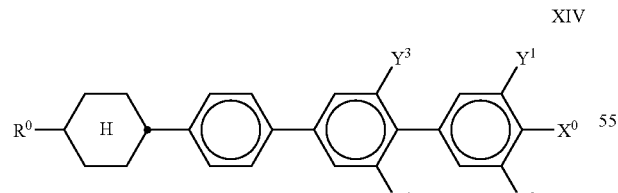

XIV

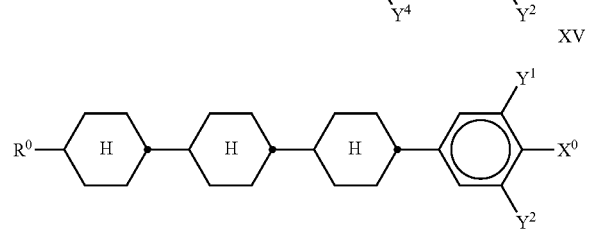

XV

-continued

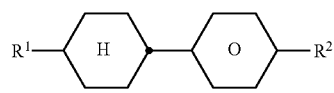

XVI wherein in compounds of formulae IX to XVI
R$^0$, X$^0$ and Y$^{1-4}$ are each, independently of one another, as defined in formulae II-VII;

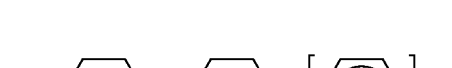

XVII wherein in compounds of formulae XVII
R$^1$ and R$^2$ are as defined in formula IB, and
Y$^1$ is as defined in formula II;

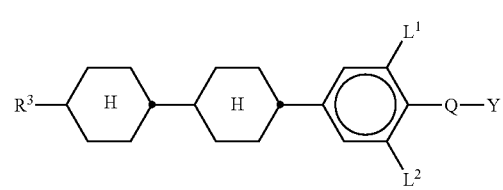

XVIII

XIX wherein in compounds of formulae XVIII and XIX
R$^1$ and R$^2$ are as defined in formula IB;

XX wherein in compounds of formulae XX
A is 1,4-phenylene or trans-1,4-cyclohexylene,
a is 0 or 1,
R$^3$ is an alkenyl group having from 2 to 9 carbon atoms, and
R$^4$ is as defined for R$^1$ in formula IA;

XXI wherein in compounds of formulae XXI
R³ is an alkenyl group with 2 to 7 carbon atoms,
Q is $CF_2$, $OCF_2$, CFH, OCFH or a single bond,
Y is F or Cl, and
$L^1$ and $L^2$ are independently of each other H or F;

XXII

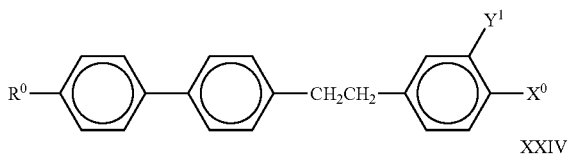
XXIII

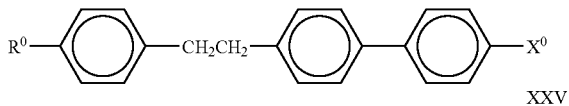
XXIV

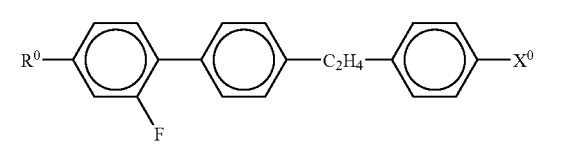
XXV

wherein in compounds of formulae XXII to XXV
$R^0$, $X^0$ and $Y^{1-4}$ are each, independently of one another, as defined in formulae II-VII, and the 1,4-phenylene rings may be substituted by CN, chlorine or fluorine;

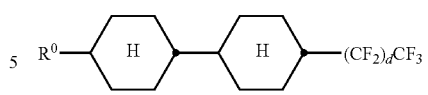
XXVI

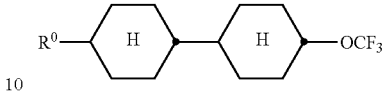
XXVII

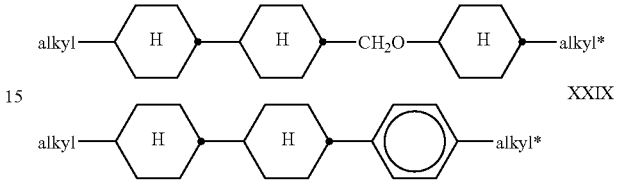
XXVIII

XXIX wherein in compounds of formulae XXVI to XXIX
$R^0$ is as defined in formulae II-VII,
d is 0, 1 or 2, and
'alkyl' and 'alkyl*' are each, independently of one another, a straight-chain or branched alkyl radical having 1-9 carbon atoms.

18. A medium according to claim 17, wherein the medium has a birefringence at 20° C. that is lower than 0.075.

19. A medium according to claim 17, wherein the medium has a birefringence at 20° C. that is from 0.06 to 0.074.

20. An electro-optical liquid crystal display containing a liquid crystal medium according to claim 17.

* * * * *